US012546436B1

(12) United States Patent
Lynch

(10) Patent No.: US 12,546,436 B1
(45) Date of Patent: Feb. 10, 2026

(54) STAND SYSTEM FOR PORTABLE ELECTRONIC DEVICE

(71) Applicant: Pioneer Square Brands, Inc., High Point, NC (US)

(72) Inventor: Riley Edvin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/315,506

(22) Filed: Aug. 30, 2025

(51) Int. Cl.
| | |
|---|---|
| *F16M 11/00* | (2006.01) |
| *F16M 11/20* | (2006.01) |
| *F16M 11/22* | (2006.01) |
| *F16N 11/10* | (2006.01) |
| *H04M 1/04* | (2006.01) |

(52) U.S. Cl.
CPC ......... *F16M 11/2014* (2013.01); *F16M 11/22* (2013.01); *F16N 11/10* (2013.01); *H04M 1/04* (2013.01)

(58) Field of Classification Search
CPC .... F16M 11/2014; F16M 11/10; F16M 11/22; H04M 1/04
See application file for complete search history.

(56) References Cited

U.S. PATENT DOCUMENTS

| | | | | |
|---|---|---|---|---|
| 6,801,426 | B2 * | 10/2004 | Ichimura | ............ F16M 11/2014 248/371 |
| 6,921,057 | B2 * | 7/2005 | Chen | ...................... F16M 11/24 248/920 |
| 8,094,244 | B2 * | 1/2012 | Sawai | .................... F16M 11/10 348/836 |
| 12,078,286 | B1 | 9/2024 | Agalgaonkar et al. | |
| 12,092,258 | B1 | 9/2024 | Agalgaonkar et al. | |
| 2020/0173491 | A1 * | 6/2020 | Dobroth | .................... F16H 1/08 |

\* cited by examiner

*Primary Examiner* — Amy J. Sterling
(74) *Attorney, Agent, or Firm* — Grandview Law PLLC

(57) ABSTRACT

A device stand system for a portable electronic device includes a device holder assembly, an elongated stand assembly, and a base assembly. The base assembly includes an upper assembly fixedly coupled to the stand assembly and a lower assembly rotatably coupled to the upper assembly about an axis of rotation. The lower assembly includes retaining tabs, a central aperture, and a bearing assembly frictionally engaged with a coupling member having a circumferential flange, cylindrical portion, and apertured end face. In implementations a grooved channel and aligned apertures define a passageway. Other aspects are described in the claims, drawings, and text forming a part of the present disclosure.

9 Claims, 26 Drawing Sheets

STAND SYSTEM FOR PORTABLE ELECTRONIC DEVICE

SUMMARY

In one or more aspects a device stand system for a portable electronic device includes (I) a device holder assembly couplable with the portable electronic device; (II) an elongated stand assembly including (i) at least one interior channel, wherein the stand assembly is coupled with the device holder assembly; and (III) a base assembly including (i) an upper assembly fixedly coupled to the elongated stand assembly, and (ii) a lower assembly rotatably coupled to the upper assembly with respect to an axis of rotation.

In implementations, wherein the lower assembly includes a plurality of radially oriented retaining tabs.

In implementations, wherein the lower assembly of the base assembly includes an aperture; and wherein the plurality of radially oriented retaining tabs are vertically oriented, disposed in a horizontal plane of the lower assembly of the base assembly, and encircle the aperture of the lower assembly of the base assembly.

In implementations, wherein the lower assembly includes a bearing assembly with an outer race frictionally coupled with the plurality of radially oriented retaining tabs.

In implementations, wherein the lower assembly includes a coupling member, wherein the coupling member includes a circumferential flange defining an inner surface, a cylindrical portion extending from the circumferential flange, an end face portion disposed at a distal end of the cylindrical portion, a plurality of apertures formed through the end face portion, an elongated aperture formed through the end face portion, and wherein the cylindrical portion includes a circumferentially extending peripheral wall.

In implementations, wherein the bearing assembly includes an inner race frictionally coupled at least partially to the circumferentially extending peripheral wall of the cylindrical portion of the coupling member.

In implementations, wherein the inner surface of the circumferential flange contacts one or more portions of the bearing assembly.

In implementations, wherein the end face portion of the cylindrical portion of the coupling member is fixedly coupled to the upper assembly of the base assembly.

In implementations, wherein the end face portion includes fastener receiving apertures to receive fasteners to fixedly couple with the upper assembly of the base assembly.

In implementations, wherein the upper assembly includes a rotational assembly; wherein the rotational assembly includes: an inner surface, an internal surface, an elongated aperture formed through the inner surface, a circumferential wall extending from the inner surface to the internal surface, the internal surface disposed around the circumferential wall, and a plurality of apertures formed through the inner surface.

Implementations can further include a ring support member, wherein the ring support member is positioned to seat against the upper assembly of the base assembly and encircle the internal surface.

In implementations, wherein the circumferential wall of the rotational assembly is sized to contact a portion of the inner race of the bearing assembly when the coupling member is coupled with the upper assembly and the inner race is frictionally coupled with the coupling member.

In implementations, wherein the lower assembly of the base assembly includes an outer surface and a grooved channel positioned relative to the outer surface.

In implementations, wherein the elongated aperture of the rotational assembly of the upper assembly, the elongated aperture of the coupling member, and the grooved channel of the lower assembly are aligned to define a common passageway.

In one or more aspects a device stand system for a portable electronic device includes a device stand system for a portable electronic device, the device stand system including (I) an elongated stand assembly including (i) at least one interior channel, wherein the stand assembly is coupled with the device holder assembly; and (II) a base assembly including (i) an upper assembly fixedly coupled to the elongated stand assembly, and (ii) a lower assembly rotatably coupled to the upper assembly with respect to an axis of rotation.

In implementations, wherein the lower assembly includes a plurality of radially oriented retaining tabs; wherein the lower assembly of the base assembly includes an aperture; wherein the plurality of radially oriented retaining tabs are vertically oriented, disposed in a horizontal plane of the lower assembly of the base assembly, and encircle the aperture of the lower assembly of the base assembly; and wherein the lower assembly includes a bearing assembly with an outer race frictionally coupled with the plurality of radially oriented retaining tabs.

In implementations, wherein the lower assembly includes a coupling member; wherein the coupling member includes a circumferential flange defining an inner surface, a cylindrical portion extending from the circumferential flange, an end face portion disposed at a distal end of the cylindrical portion, a plurality of apertures formed through the end face portion, and an elongated aperture formed through the end face portion; wherein the cylindrical portion includes a circumferentially extending peripheral wall; and wherein the bearing assembly includes an inner race frictionally coupled at least partially to the circumferentially extending peripheral wall of the cylindrical portion of the coupling member.

In one or more aspects a device stand system for a portable electronic device includes (I) a device holder assembly couplable with the portable electronic device; and (II) a base assembly including (i) an upper assembly fixedly coupled to the device holder assembly, and (ii) a lower assembly rotatably coupled to the device holder assembly with respect to an axis of rotation.

In implementations, wherein the lower assembly includes a plurality of radially oriented retaining tabs; wherein the lower assembly of the base assembly includes an aperture; wherein the plurality of radially oriented retaining tabs are vertically oriented, disposed in a horizontal plane of the lower assembly of the base assembly, and encircle the aperture of the lower assembly of the base assembly; wherein the coupling member includes a circumferential flange defining an inner surface, a cylindrical portion extending from the circumferential flange, an end face portion disposed at a distal end of the cylindrical portion, a plurality of apertures formed through the end face portion, an elongated aperture formed through the end face portion, and wherein the cylindrical portion includes a circumferentially extending peripheral wall; and wherein the bearing assembly includes an inner race frictionally coupled at least partially to the circumferentially extending peripheral wall of the cylindrical portion of the coupling member.

In implementations, wherein the upper assembly includes a rotational assembly; wherein the rotational assembly includes: an inner surface, an internal surface, an elongated aperture formed through the inner surface, a circumferential wall extending from the inner surface to the internal surface, the internal surface disposed around the circumferential wall, and a plurality of apertures formed through the inner surface; wherein the lower assembly of the base assembly includes an outer surface and a grooved channel positioned relative to the outer surface; and wherein the elongated aperture of the rotational assembly of the upper assembly, the elongated aperture of the coupling member, and the grooved channel of the lower assembly are aligned to define a common passageway.

In addition to foregoing, other aspects are described in claims, drawings, and text forming a part of disclosure set forth herein. Various other aspects are set forth and described in teachings such as text (e.g., claims and/or detailed description) and/or drawings of present disclosure. foregoing is a summary and thus may contain simplifications, generalizations, inclusions, or omissions of detail; consequently, those skilled in art will appreciate that summary is illustrative only and is NOT intended to be in any way limiting. Other aspects, features, and advantages of devices and/or processes and/or other subject matter described herein will become apparent in teachings set forth herein.

BRIEF DESCRIPTION OF FIGURES

For a more complete understanding of implementations, reference now is made to following descriptions taken in connection with accompanying drawings, use of same symbols in different drawings typically indicates similar or identical items, unless context dictates otherwise.

With reference now to figures, shown are one or more examples of Stand System for Portable Electronic Device, articles of manufacture, compositions of matter for same that may provide context, for instance, in introducing one or more processes and/or devices described herein.

DETAILED DESCRIPTION

Figure 1:
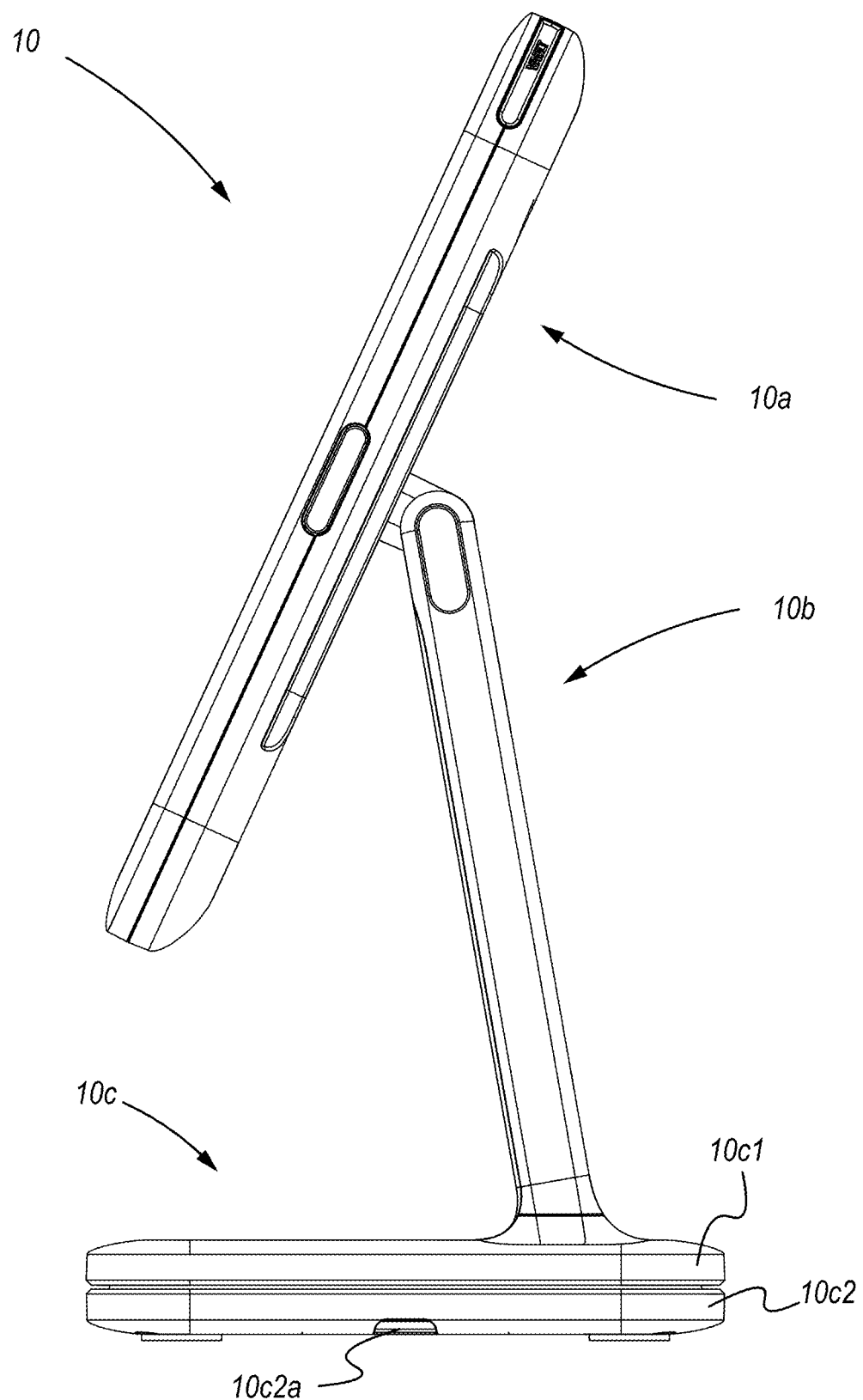
FIG. 1 is a side elevational view of device stand system in a first rotational position.

In the following detailed description, reference is made to accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of subject matter presented here.

Turning to FIG. 1, depicted therein is a side elevational view of device stand system 10 in a first rotational position. system includes a device holder assembly 10*a* configured to support a portable electronic device, elongated stand assembly 10*b* operatively coupled to device holder assembly 10*a*, and base assembly 10*c* that provides rotational support and stability for stand system 10. Base assembly 10*c* includes upper assembly 10*c*1 and a lower assembly 10*c*2, latter of which is formed with a grooved channel 10*c*2*a* for routing of cabling from exterior to interior of lower assembly 10*c*2. In first rotational position, elongated stand assembly 10*b* is positioned for viewing of a portable electronic device by a user in a first location (not shown).

Figure 2:
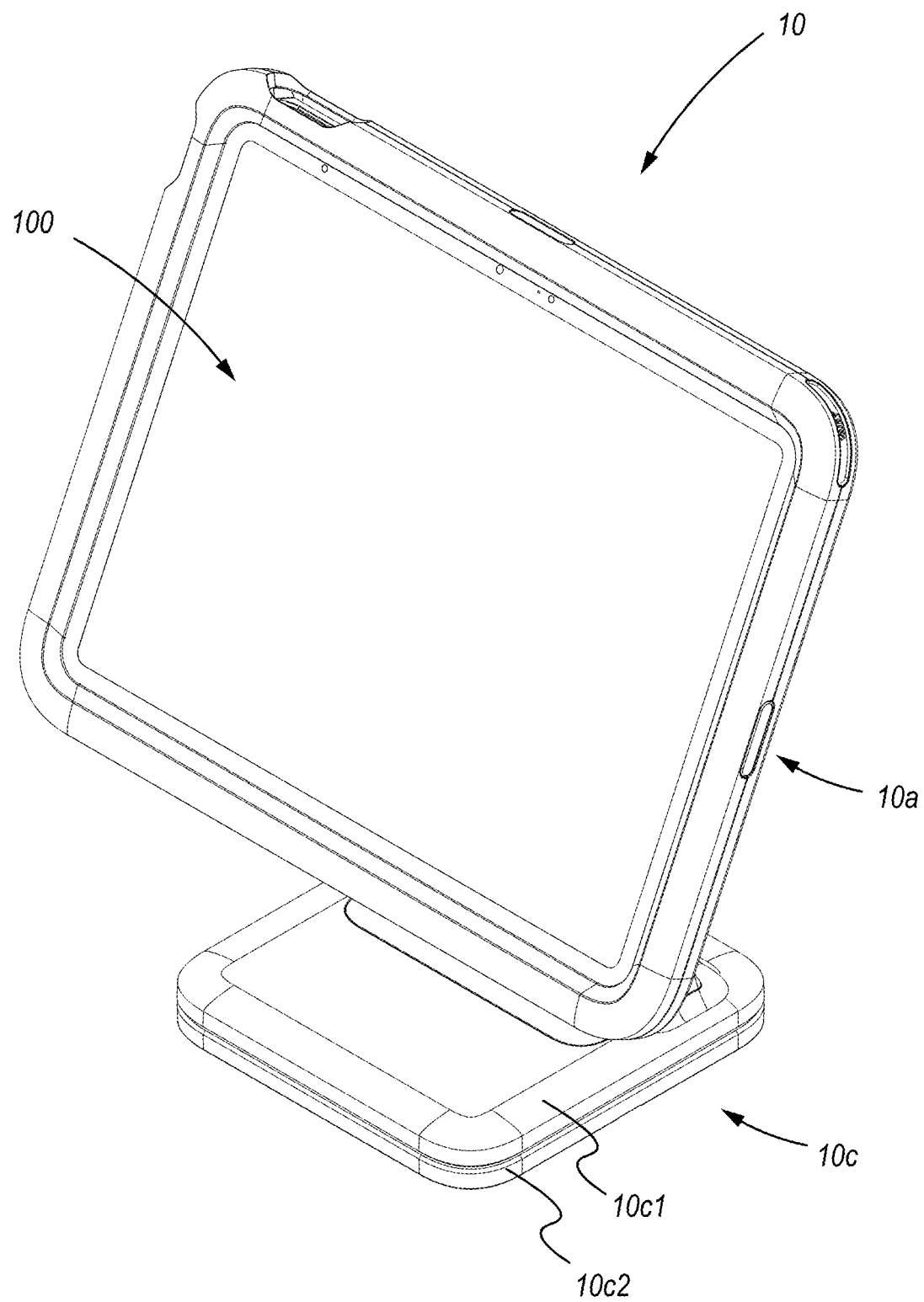
FIG. 2 is a front perspective view of device stand system of FIG. 1 in a second rotational position.

Turning to FIG. 2, a front perspective view is shown of device stand system 10 in a second rotational position, wherein device holder assembly 10*a* is arranged to receive and retain a portable electronic device 100. In this configuration, elongated stand assembly 10*b* has been rotated relative to base assembly 10*c* to alter viewing location of a user, while maintaining secure engagement with base assembly 10c through coupling structures shown and described herein.

Figure 3:
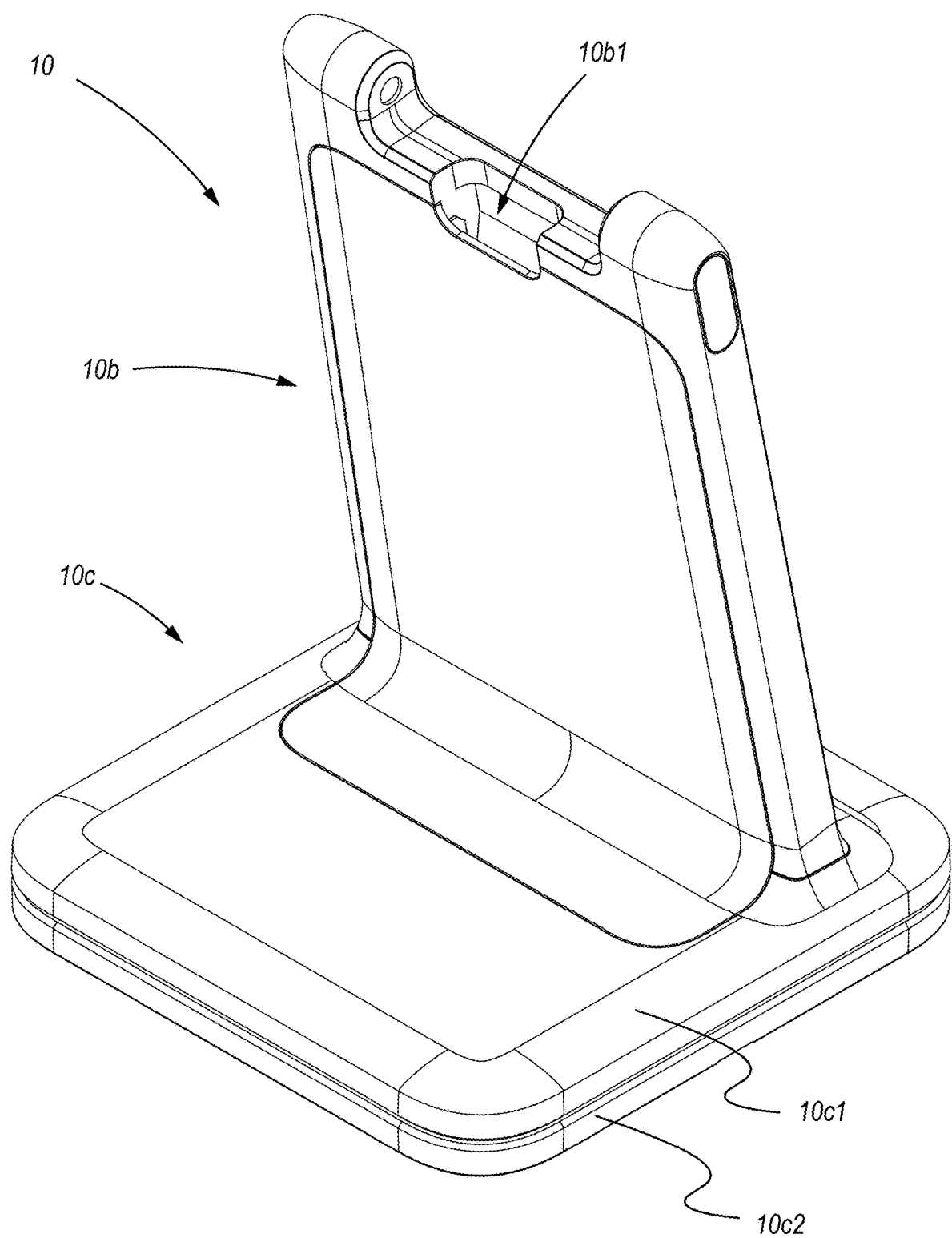
FIG. 3 is a front perspective view of a portion of device stand system of FIG. 1 in second rotational position.

Turning to FIG. 3, a front perspective view is provided of a portion of device elongated stand assembly 10b in second rotational position, showing interior channel 10b1 formed along inner surface of stand system to route wiring between device holder assembly 10a and base assembly 10c in a manner permitting smooth rotational movement between positions.

Figure 4:
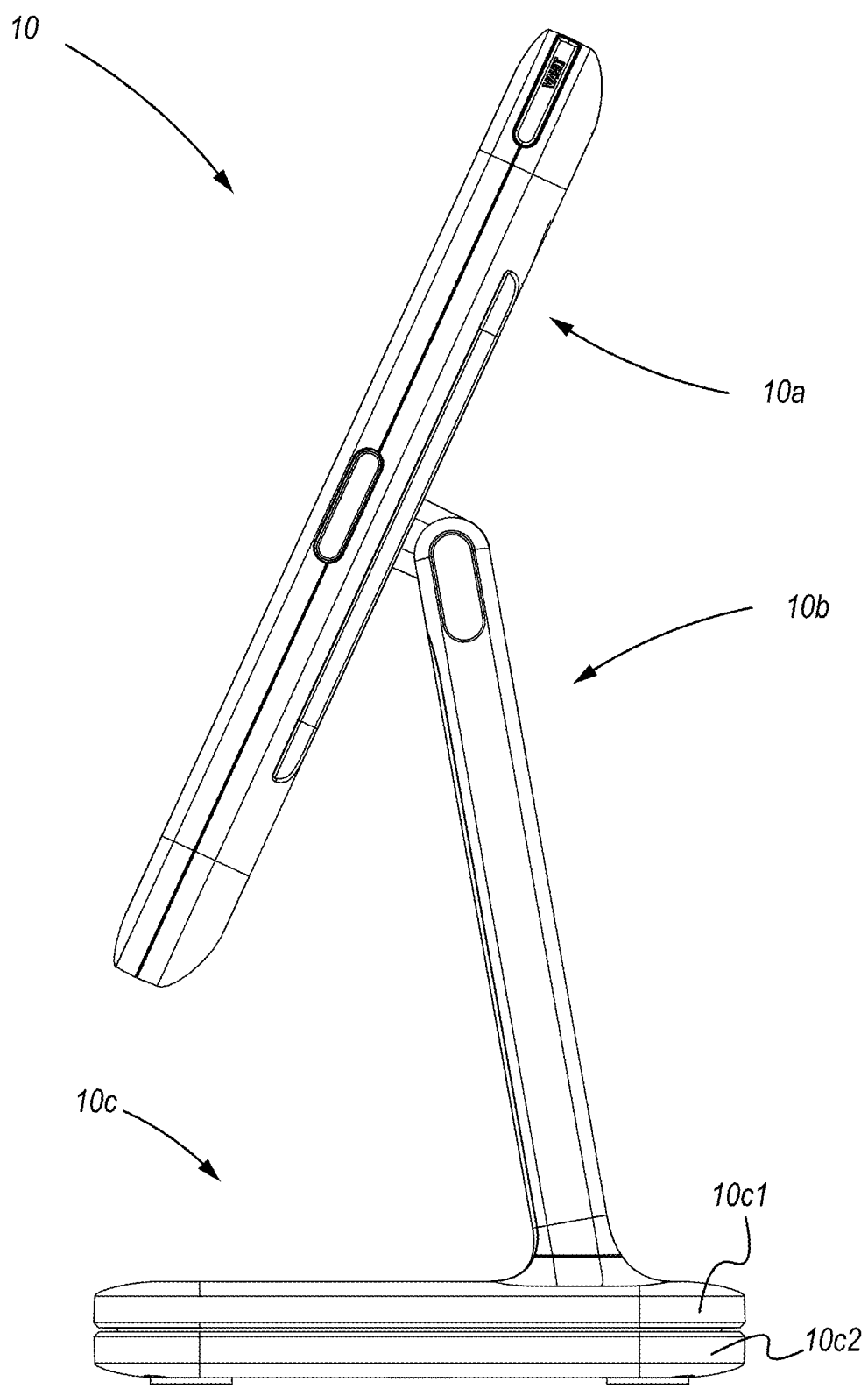
FIG. 4 is a side elevational view portion of device stand system of FIG. 1 in second rotational position.

Turning to FIG. 4, a side elevational view is shown of device stand system 10 with elongated stand assembly 10b in the second rotational position relative to base assembly 10c further illustrating relative positioning of elongated stand assembly 10b with respect to base assembly 10c.

Figure 5:
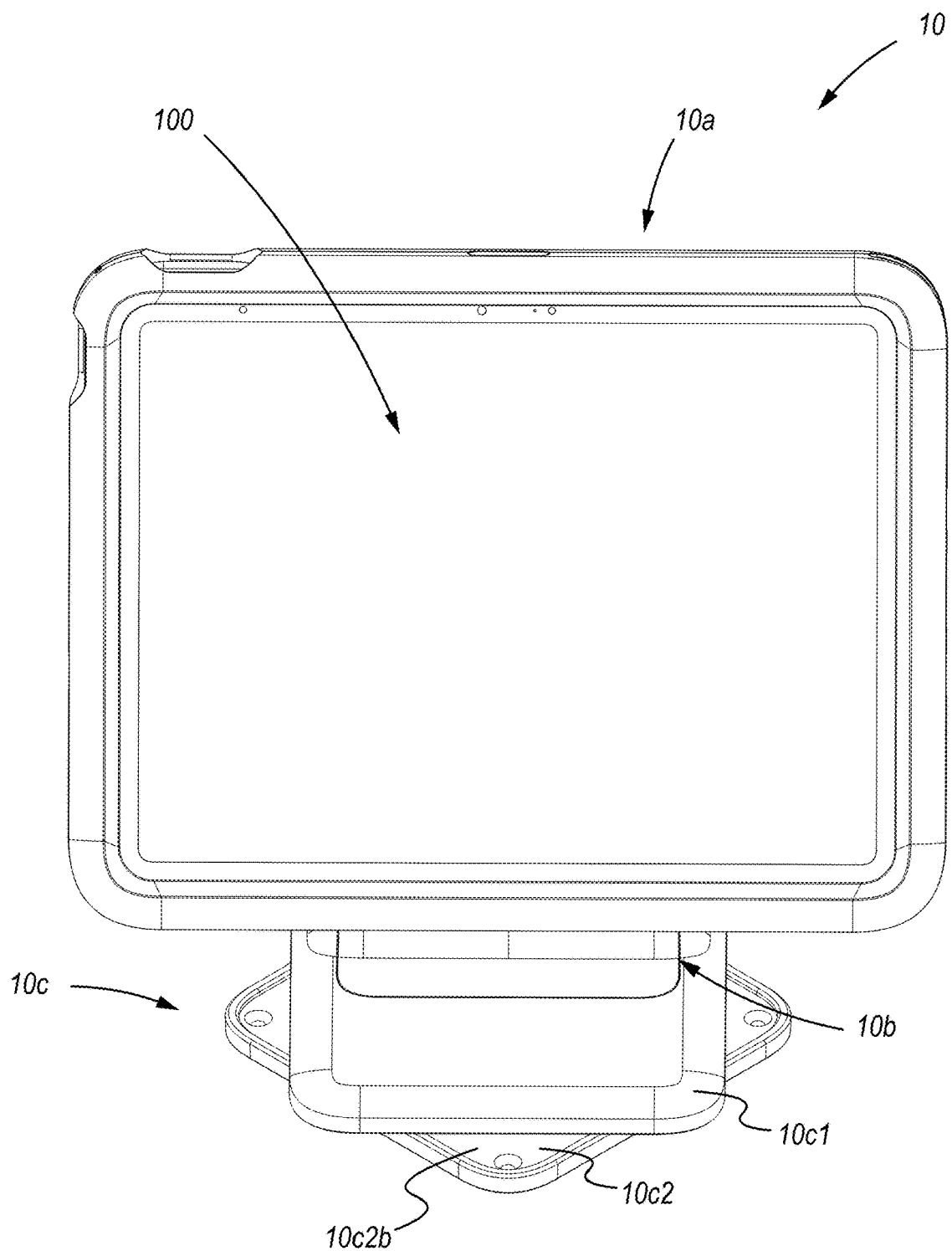
FIG. 5 is a front perspective view of device stand system of FIG. 1 in a third rotational position.

Turning to FIG. 5, a front perspective view of device stand system 10 in a third rotational position is shown. In this position, lower assembly 10c2 presents an inner surface 10c2b which interfaces with corresponding structural and rotational elements in upper assembly 10c1 to maintain positional stability while allowing for further adjustment.

Figure 6:
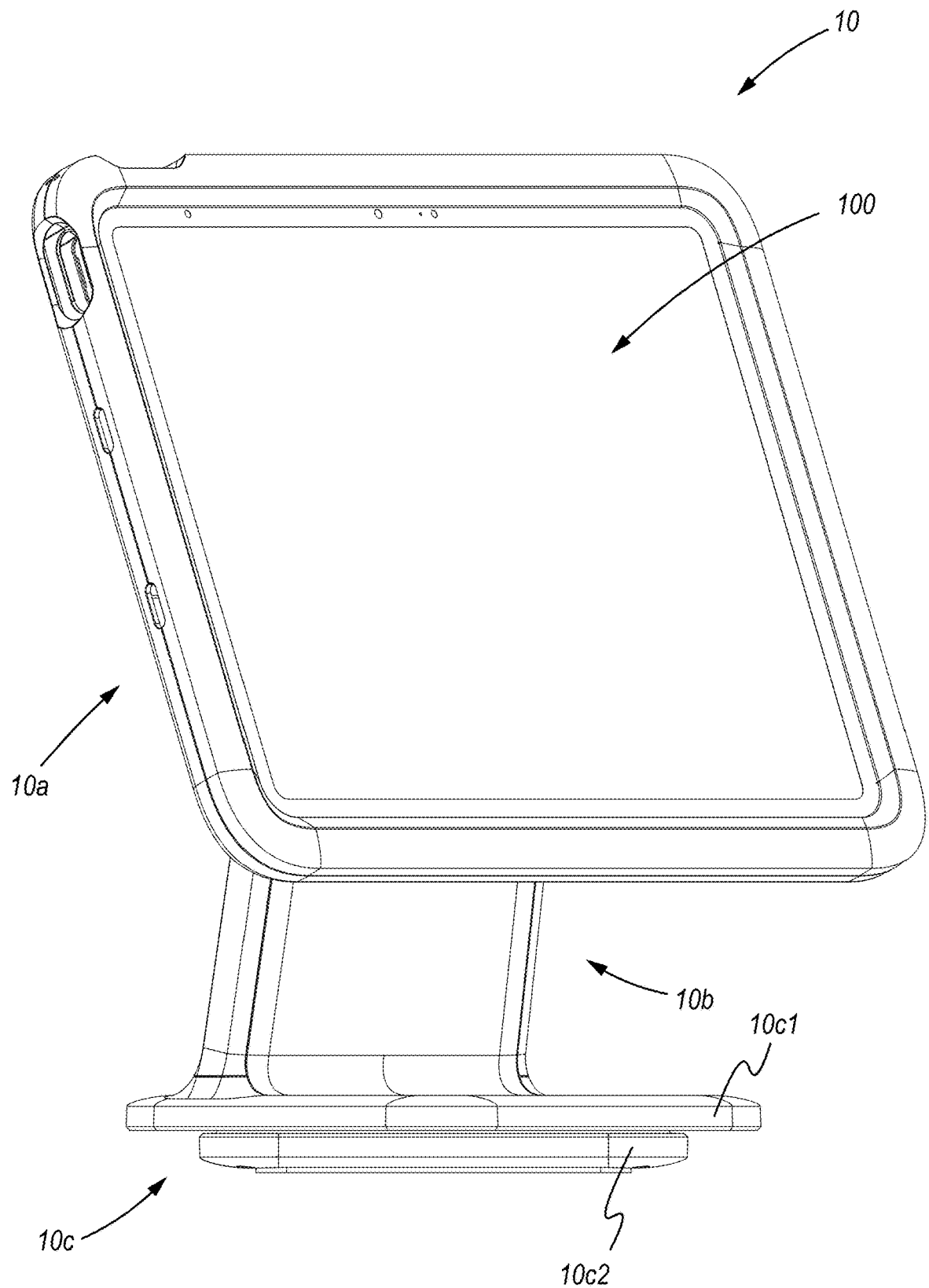
FIG. 6 is a front perspective view of device stand system of FIG. 1 in third rotational position.

Turning to FIG. 6, another front perspective view of device stand system 10 in third rotational position is provided, showing same arrangement as FIG. 5 from a slightly altered angle to highlight engagement between elongated stand assembly 10b and base assembly 10c.

Figure 7:
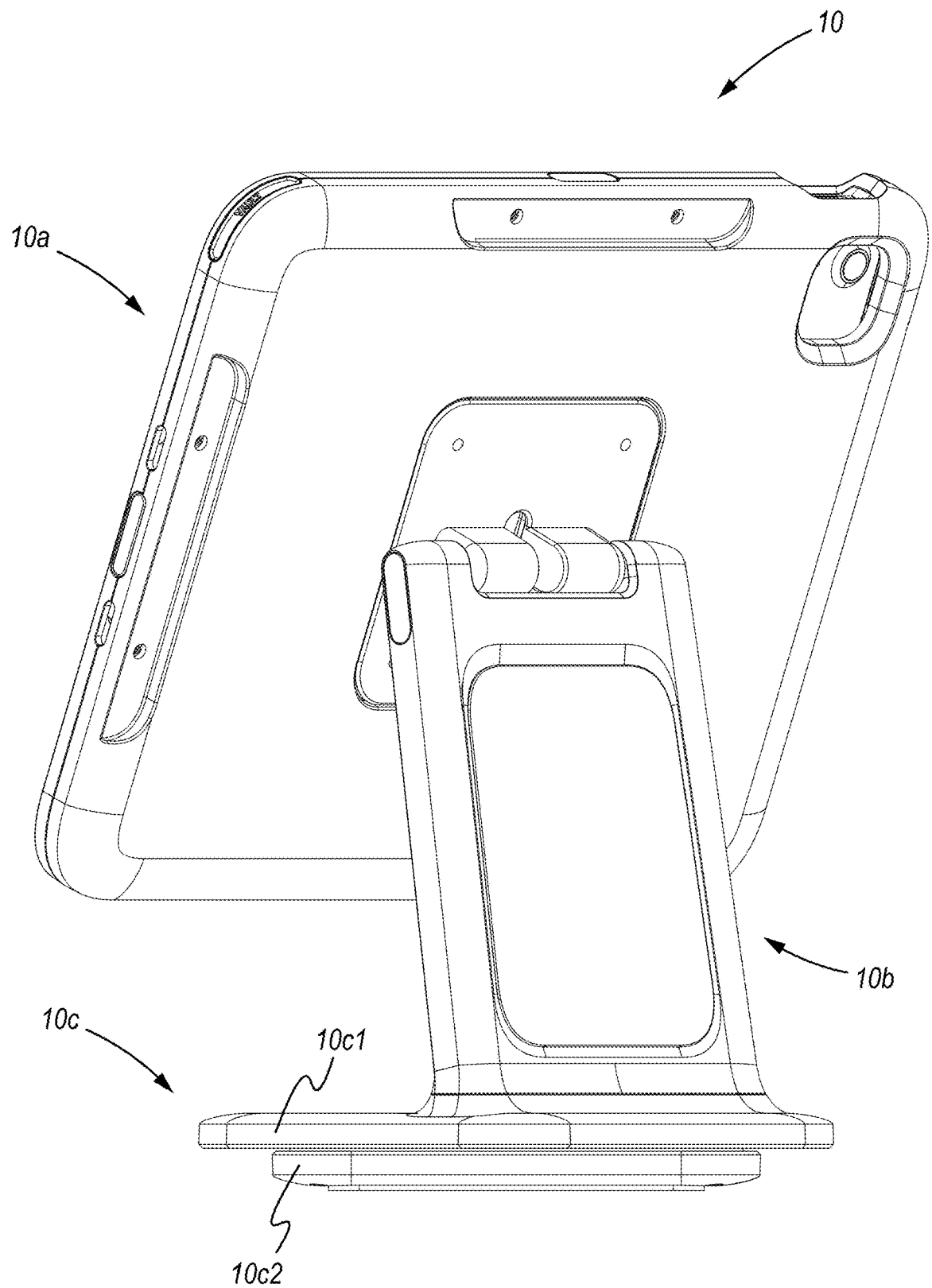
FIG. 7 is a rear perspective view of device stand system of FIG. 1 in third rotational position.

Turning to FIG. 7, a rear perspective view of device stand system 10 in third rotational position illustrates rear surfaces of elongated stand assembly 10b and base assembly 10c, including outer surfaces and any rearward stabilizing elements that may be employed to counterbalance weight of portable electronic device 100 in this position.

Figure 8:
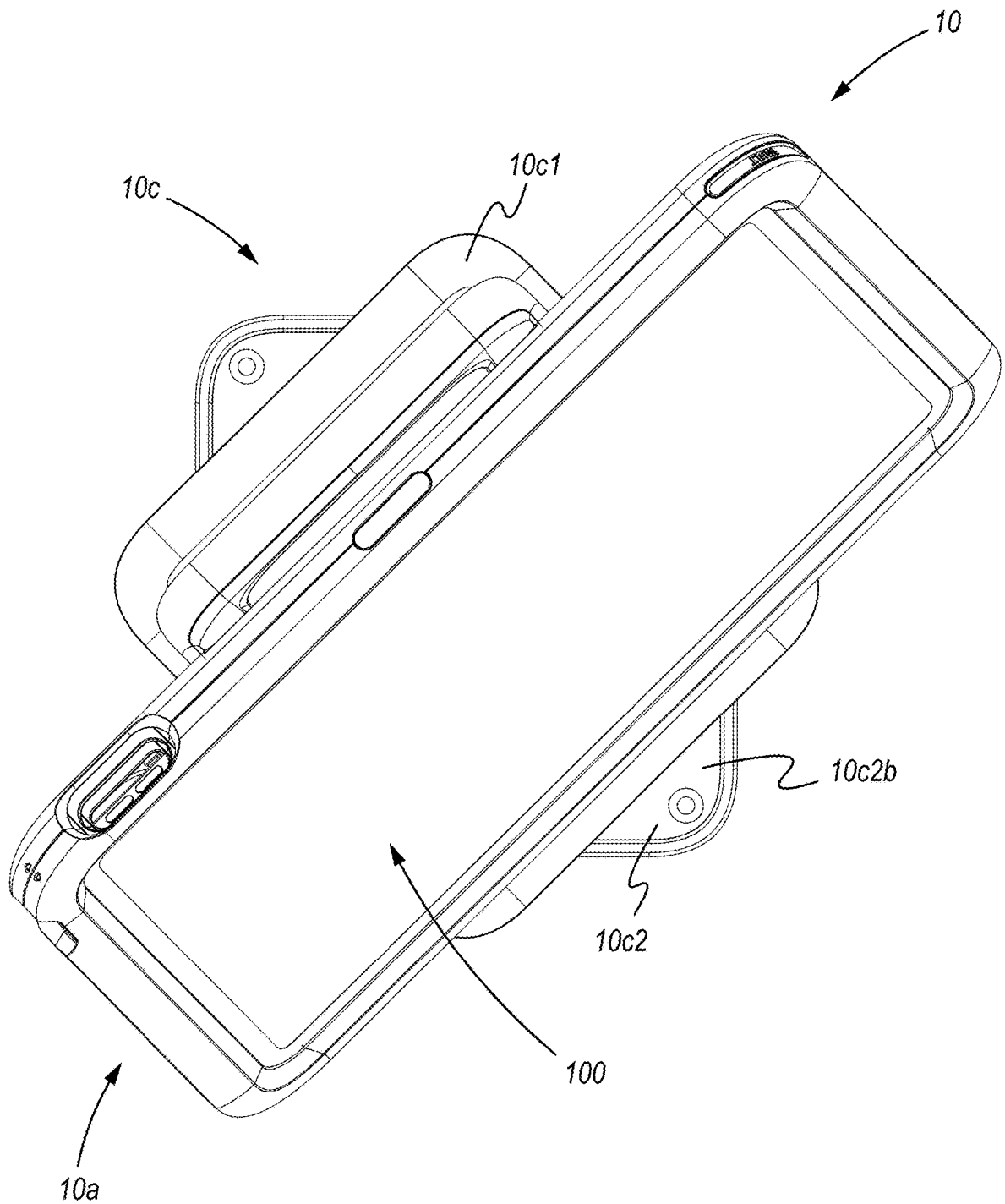
FIG. 8 is a top perspective view of device stand system of FIG. 1 in third rotational position.

Turning to FIG. 8, a top perspective view is shown of device stand system 10 in third rotational position, showing alignment between upper assembly 10c1 and elongated stand assembly 10b along rotational axis.

Figure 9:
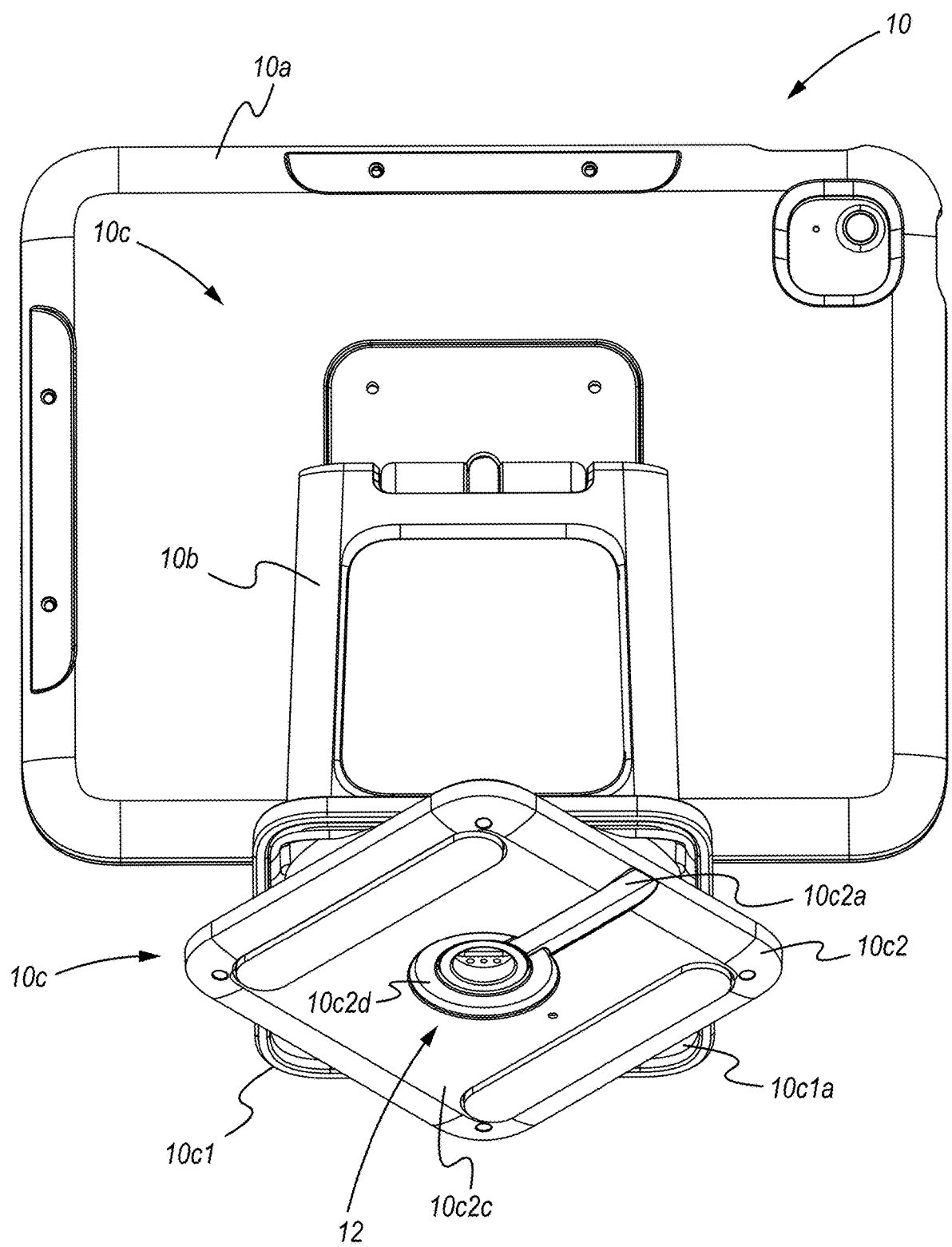
FIG. 9 is a bottom perspective view of device stand system of FIG. 1 in third rotational position.

Turning to FIG. 9, a bottom perspective view of device stand system 10 in third rotational position is illustrated. This view reveals inner surface 10c1a of upper assembly 10c1, outer surface 10c2c of lower assembly 10c2, and outer floor surface 10c2d which provides a stable contact point with a supporting surface.

Figure 10:
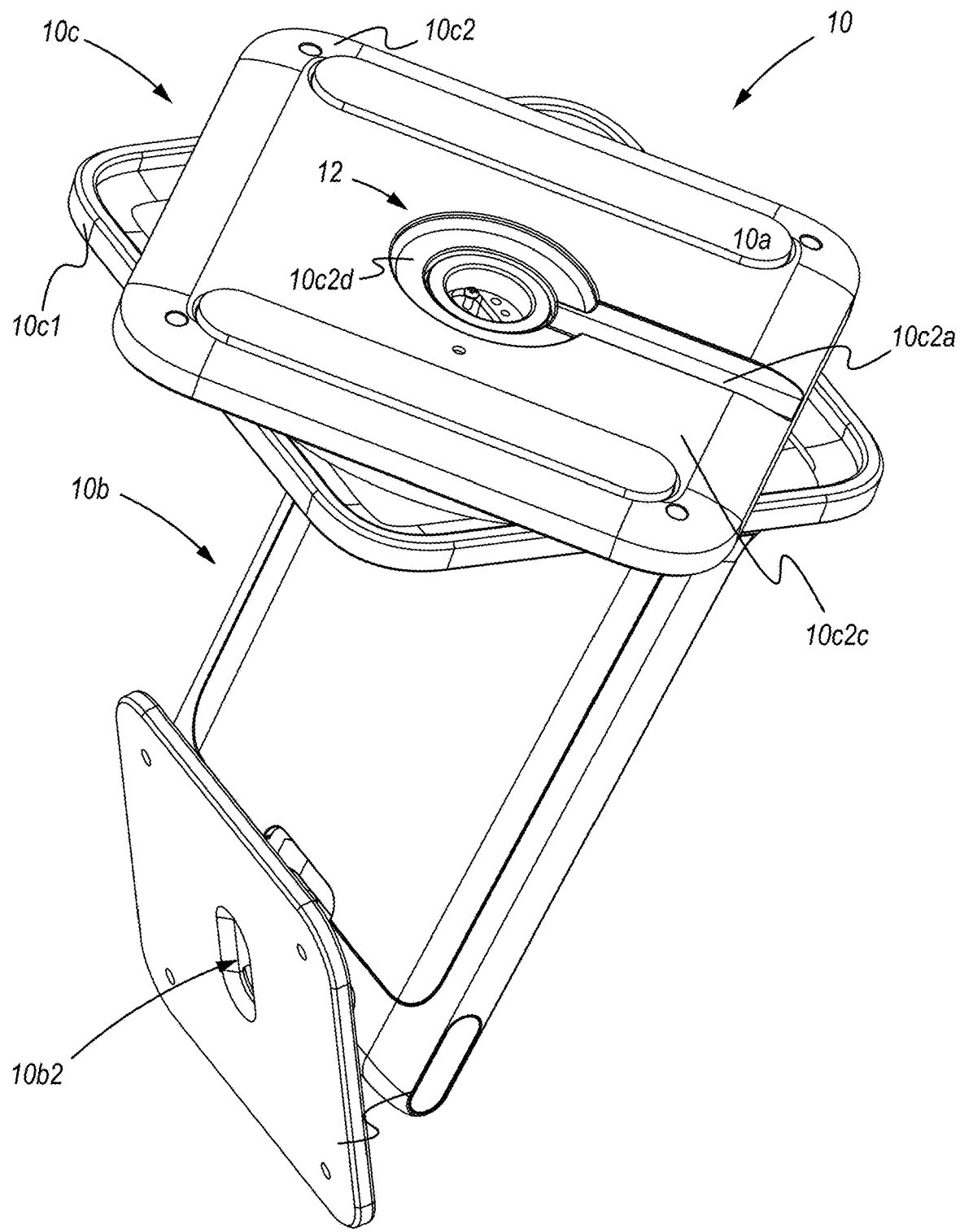
FIG. 10 is a bottom perspective view of a lower portion of device stand system of FIG. 1 in third rotational position.

Turning to FIG. 10, a bottom perspective view of a lower portion of device elongated stand assembly 10b in third rotational position is shown, highlighting aperture 10b2 formed therein for receiving a coupling or fastener element connecting elongated stand assembly 10b to rotational components within base assembly 10c.

Figure 11:
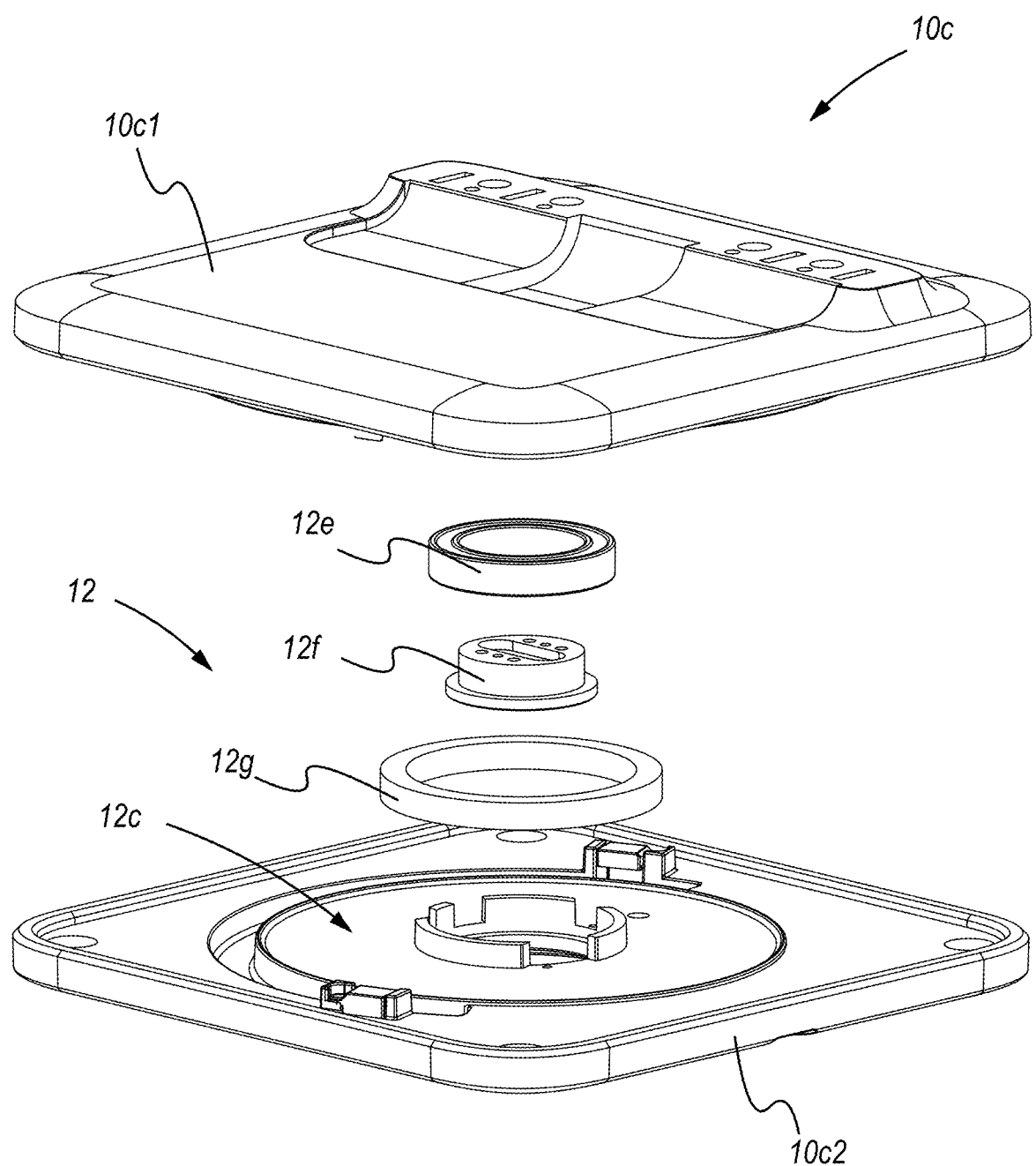
FIG. 11 is an exploded perspective view of a base assembly of device stand system of FIG. 1 in first rotational position.

Turning to FIG. 11, an exploded perspective view is provided of base assembly 10c in first rotational position, showing rotational assembly 12 including retaining tab plurality 12c, a bearing assembly 12e, a coupling member 12f, and a ring support member 12g. These components collectively enable smooth rotational movement of elongated stand assembly 10b relative to base assembly 10c while maintaining structural integrity and load-bearing capacity. upper assembly 10c1 is positioned above rotational assembly 12, which includes bearing assembly 12e, coupling member 12f, and ring support member 12g. These elements are secured into lower assembly 10c2, whose retaining tab plurality 12c position and retain them. coupling member 12f is secured to rotational assembly 10c1b of upper assembly 10c1 by screws extending through apertures 12f2a1-12f2a6 in coupling member end portion and into apertures 10c1b5 in rotational assembly. cylindrical peripheral wall 12f2c is frictionally coupled with inner race 12e1 of bearing assembly 12e, while outer race 12e3 of bearing assembly is frictionally coupled with retaining tab plurality 12c of lower assembly 10c2. inner surface 12f1a of coupling member circumferential flange is arranged to contact mid-ring 12e2a of bearing assembly, providing an axial thrust surface that maintains stable alignment. Bearing assembly 12e allows low-friction rotation between assemblies; coupling member 12f transmits loads; ring support member 12g maintains coaxial alignment. Variants may use roller or polymer bushings, with coupling member 12f in metal, high-strength plastic, or composite.

Figure 12:
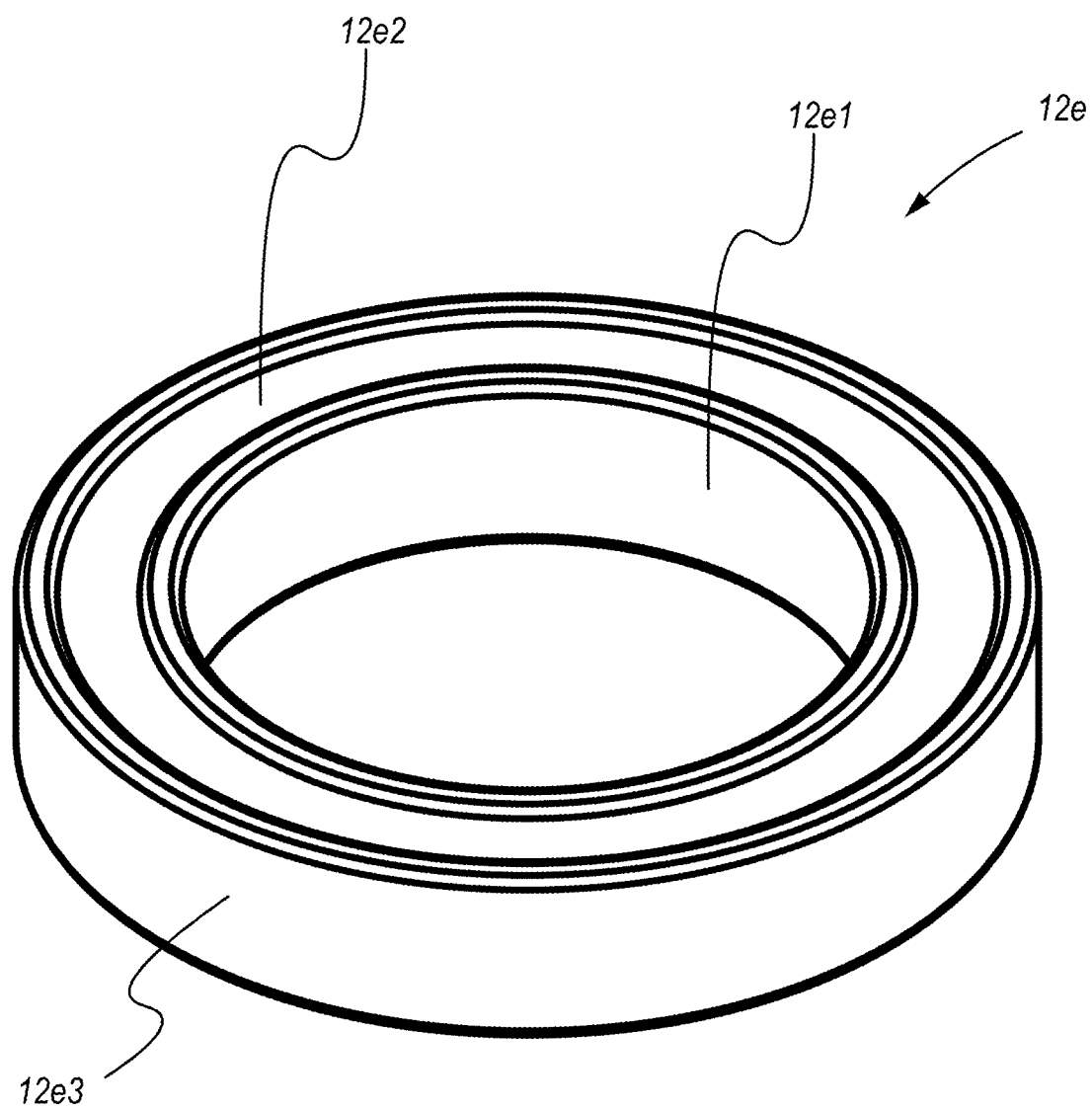
FIG. 12 is a top perspective view of a bearing assembly of base assembly of FIG. 11.

Turning to FIG. 12, a top perspective view is shown of bearing assembly 12e of FIG. 11. bearing assembly 12e includes an inner race 12e1, a mid-ring 12e2, and an outer race 12e3. These elements cooperate to provide low-friction rotational engagement between elongated stand assembly 10b and base assembly 10c, distributing loads evenly to ensure durability during repeated rotation. Inner and outer races rotate relative to each other with rolling elements in between. Mid-ring 12e2 acts as spacer or retainer and provides axial contact surface as inner surface 12f1a of coupling member. inner race 12e1 is frictionally engaged with peripheral wall 12f2c of coupling member to transmit torque without slip, while outer race 12e3 is frictionally retained against retaining tab plurality 12c of lower assembly. bearing assembly can be sealed or open; it may be integrated into coupling member or be a thin-section type to reduce height.

Figure 13:
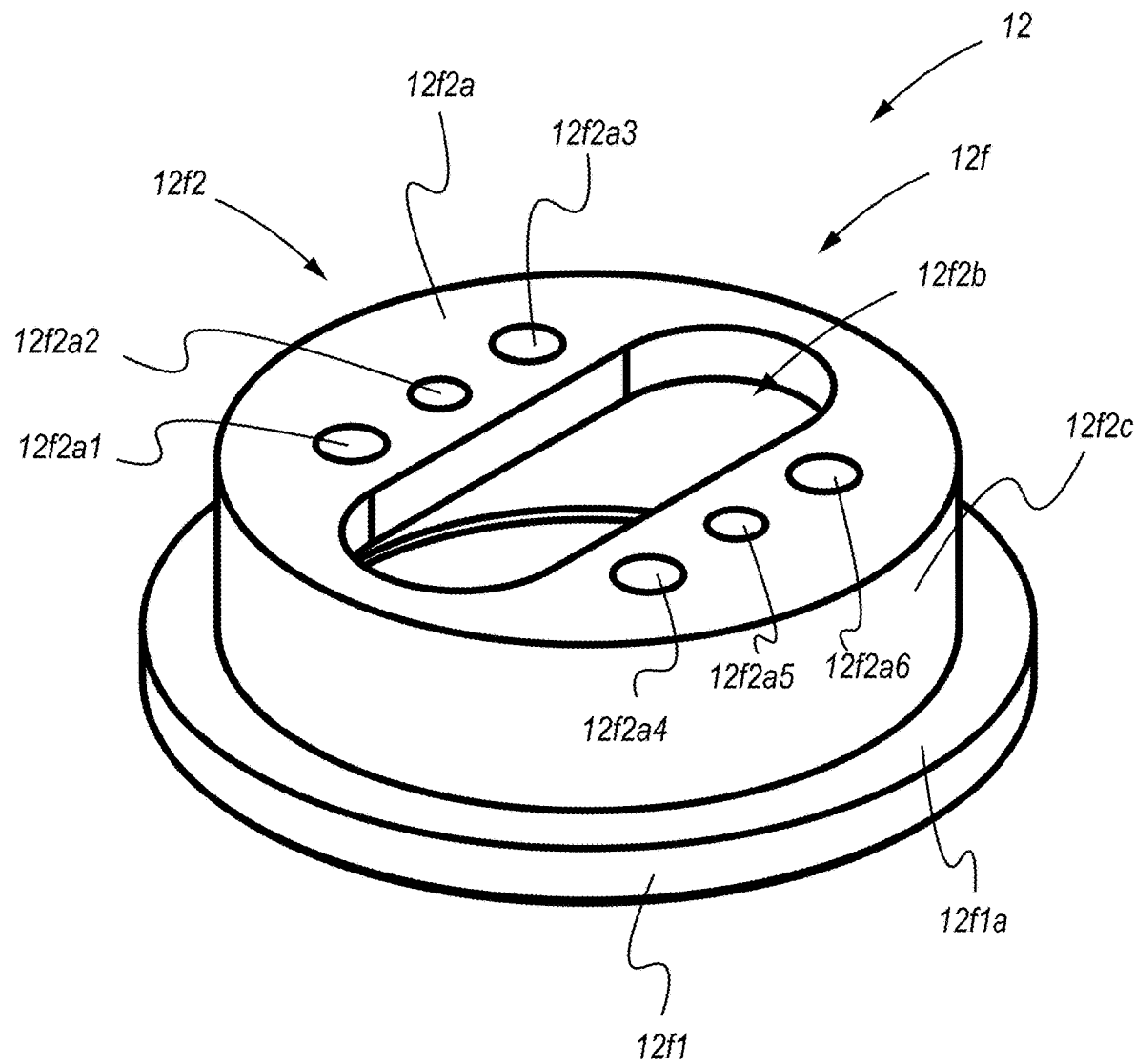
FIG. 13 is a top perspective view of a coupling member of base assembly of FIG. 11.

Turning to FIG. 13, a top perspective view of coupling member 12f of FIG. 11 is shown. coupling member 12f includes a circumferential flange 12f1 having an inner surface 12f1a, and a cylindrical portion 12f2 extending from circumferential flange. cylindrical portion 12f2 terminates in end face portion 12f2a formed with a series of apertures 12f2a1 through 12f2a6, each arranged to receive fasteners or alignment pins. cylindrical portion 12f2 also includes an elongated aperture 12f2b and a peripheral wall 12f2c that interfaces with corresponding features of bearing assembly 12e and ring support member 12g to secure rotational assembly. coupling member is attached to rotational assembly 10c1b of upper assembly 10c1 by screws mating between apertures 12f2a1-12f2a6 and apertures 10c1b5. Peripheral wall 12f2c is frictionally coupled with bearing assembly inner race 12e1 to ensure torque transfer, and inner surface 12f1a contacts mid-ring 12e2a to provide axial support. Variations may have keyed ends for alignment or locking tabs to limit rotation.

Figure 14:
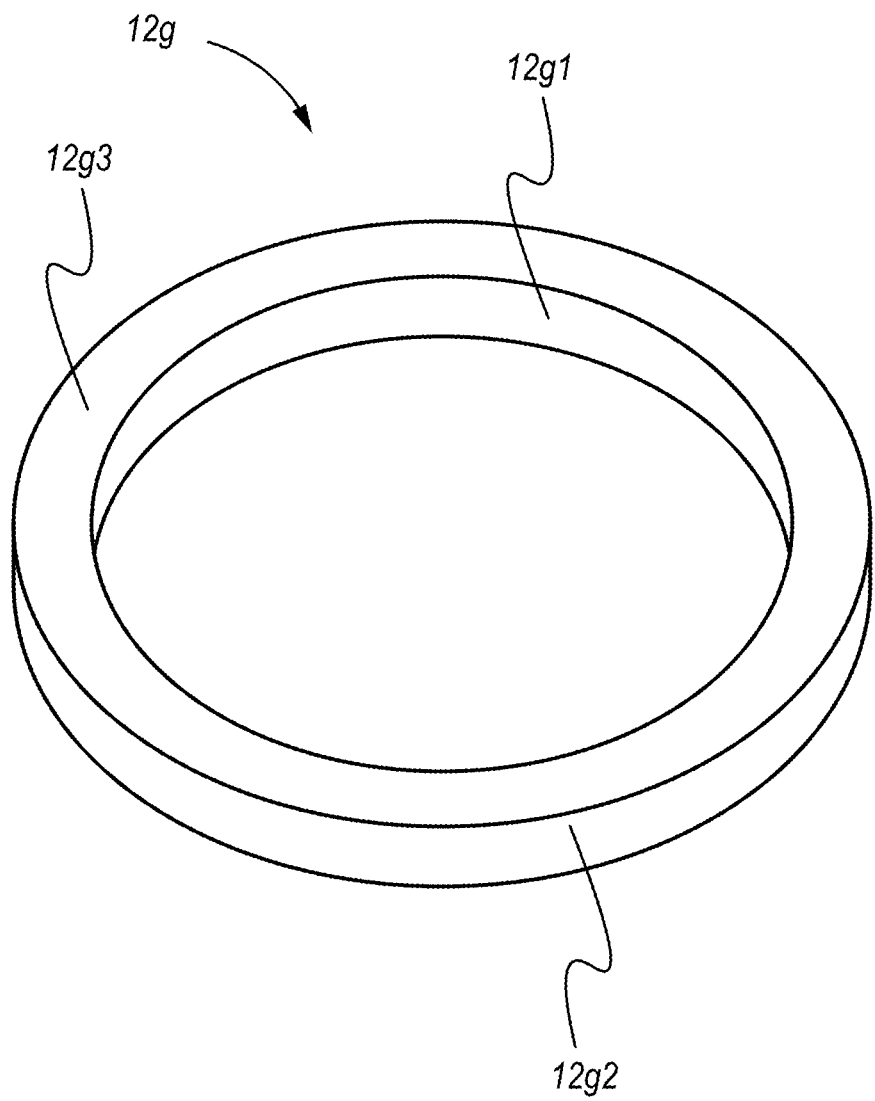
FIG. 14 is a perspective view of a ring support member of base assembly of FIG. 11.

Turning to FIG. 14, a perspective view is shown of ring support member 12g of FIG. 11. ring support member 12g includes an inner surface 12g1, an outer surface 12g2, and a top surface 12g3 configured to contact underside of elongated stand assembly 10b. This component provides both structural support and rotational alignment for device stand system 10. outer surface 12g2 may be smooth or grooved for friction control. Alternatives include self-lubricating materials or detent features.

Figure 15:
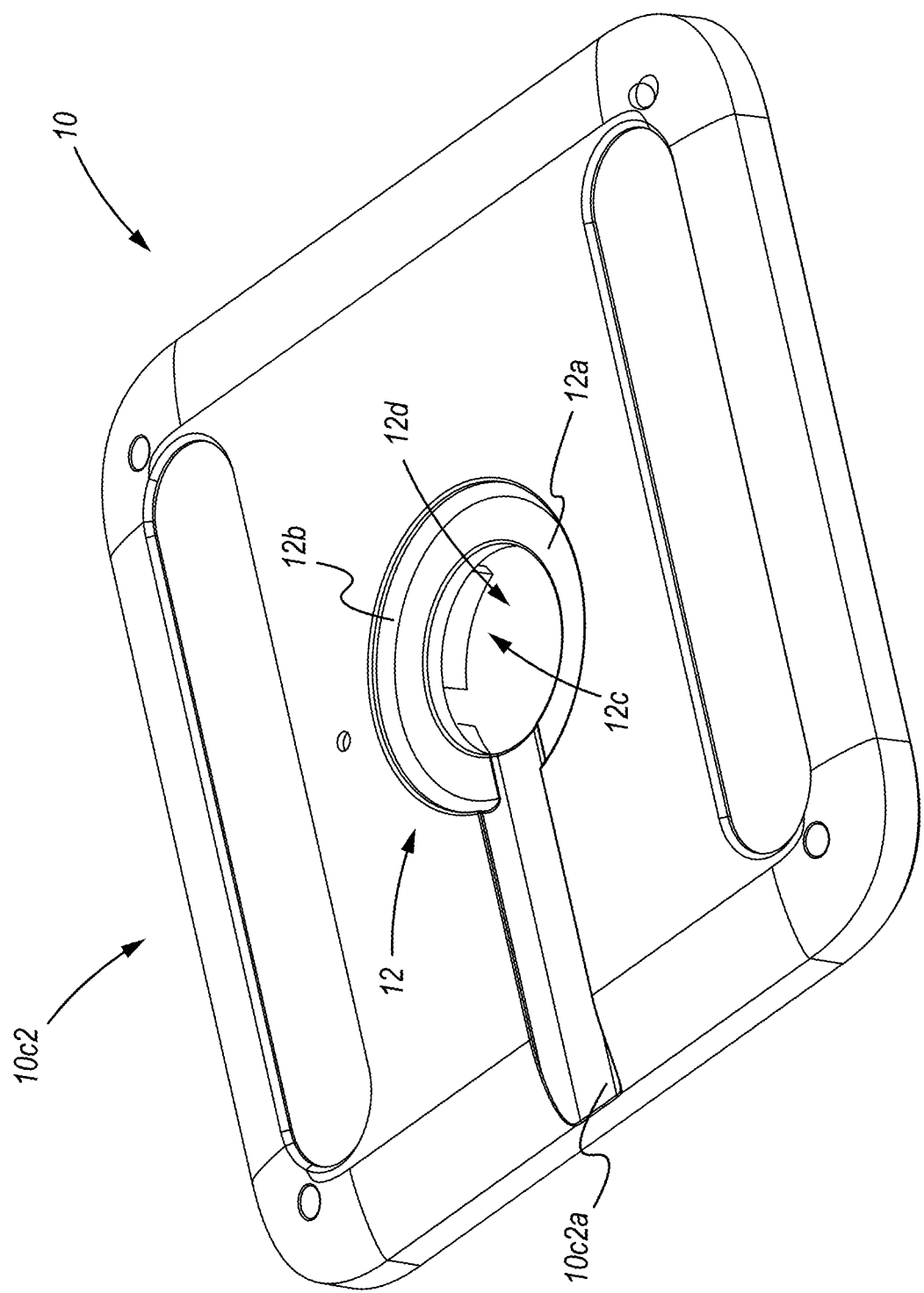
FIG. 15 is a bottom perspective view of lower portion of base assembly of FIG. 11.

Turning to FIG. 15, a bottom perspective view of lower assembly 10c2 of base assembly 10c is provided. Implementations of lower assembly 10c2 include lower circumferential wall 12c2e and aperture 12d. Materials can include molded polymer or die-cast metal.

Figure 16:
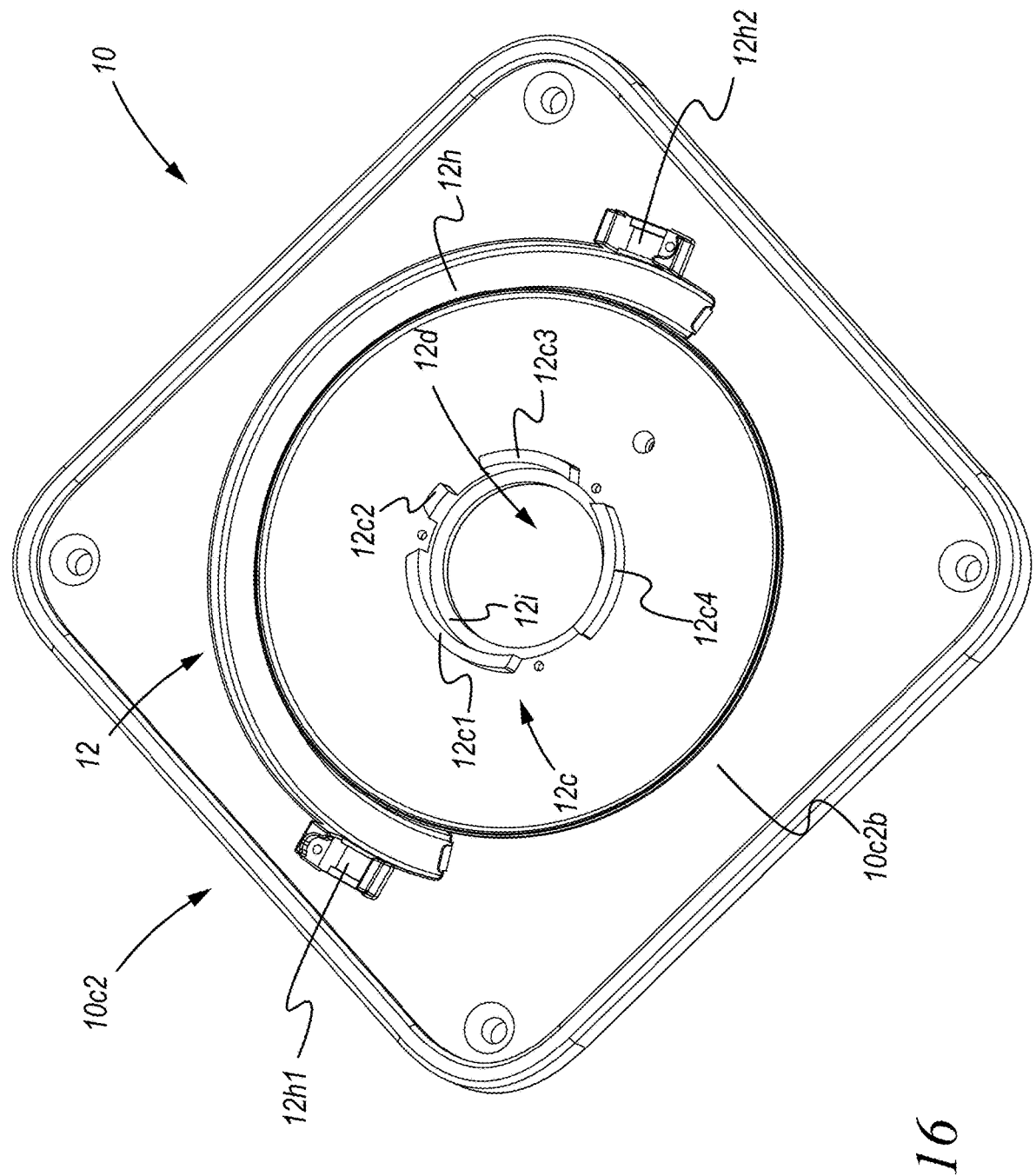
FIG. 16 is top plan view of lower base assembly portion of FIG. 15.

Turning to FIG. 16, a top plan view of lower assembly 10c2 is shown, depicting arrangement of retaining tab plurality is a plurality of radially oriented retaining tabs 12c including retaining tabs 12c1 through 12c4 circumferentially disposed around aperture 12d. Each retaining tab 12c is shown to extend generally perpendicular with respect to the aperture plane and surface surrounding the aperture. The plurality of radially oriented retaining tabs 12c are configured to frictionally engage and secure outer bearing race 12e3 of bearing assembly 12e. In the illustrated implementation, individual retaining tabs 12c1-12c4 are representative of the plurality. As used herein, the term 'tab' denotes a structural projection formed integrally with a body portion. While tabs are commonly flat or plate-like, the term as used herein encompasses upstanding or raised projections of varying geometry, provided they are configured for the retaining function described.

Also shown is a circumferential groove assembly 12h including magnets 12h1 and 12h2 adjacent thereby, which interact with corresponding magnet 10c1c (shown in FIG. 20) in upper assembly 10c1 to provide positional retention. Alternative implementations of groove assembly 12h can include house springs, rollers, or cams for different tactile feedback.

Figure 17:
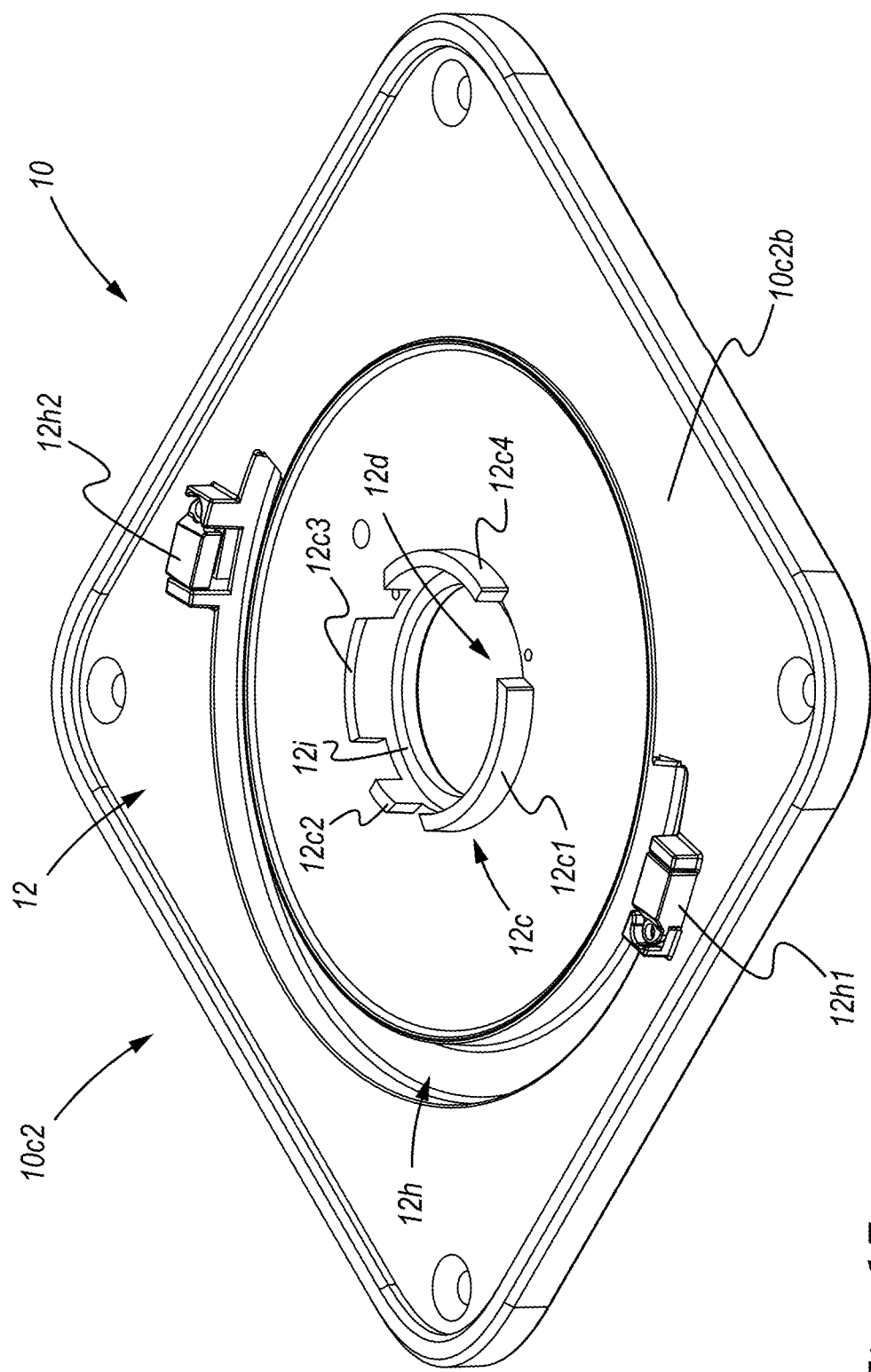
FIG. 17 is a top perspective view of lower base assembly portion of FIG. 15.

Turning to FIG. 17, a top perspective view of lower assembly 10c2 of FIG. 15 is shown from an alternate angle to further illustrate positions of retaining tabs 12c1-12c4 and circumferential groove assembly 12h. Retaining tabs 12c1-12c4 may be spring-loaded and magnets 12h1 and 12h2 maybe replaceable for adjustable holding force.

Figure 18:
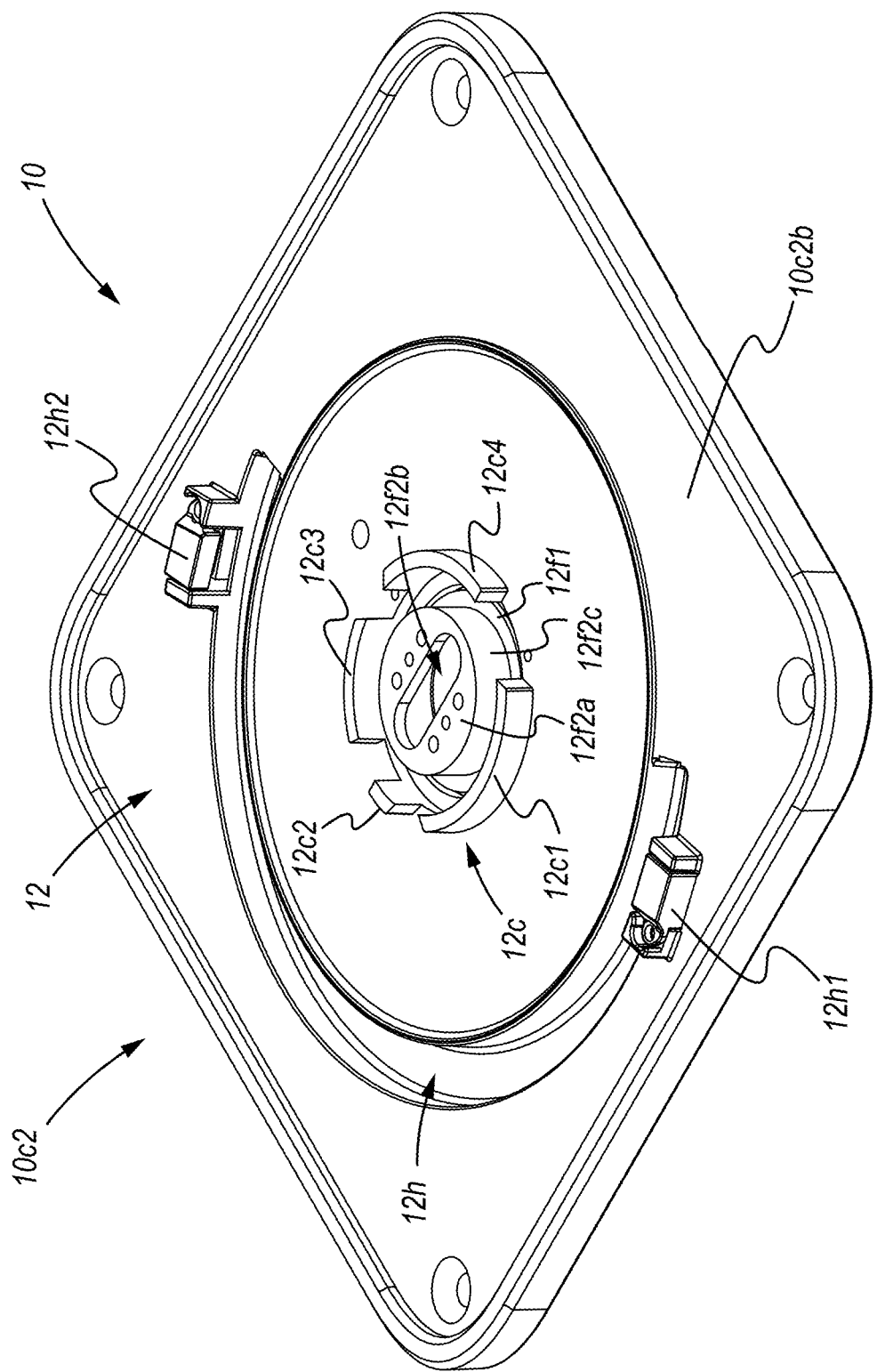
FIG. 18 is a top perspective view of lower base assembly portion of FIG. 15 coupled with coupling member of FIG. 13.

Turning to FIG. 18, a top perspective view of lower assembly 10c2 coupled with coupling member 12f of FIG. 13 is shown, demonstrating how cylindrical portion 12f2 extends through lower assembly 10c2 for axial rotation alignment. This allows torque transfer from upper assembly 10c1 via coupling member 12f to bearing assembly 12e to help reduce base wear. Appropriate sizing of coupling member 12f and bearing assembly 12e is determined to provide sufficient frictional fit between coupling member peripheral wall 12f2c and inner race 12e1 to ensure torque transmission therefrom without slippage therebetween.

Figure 19:
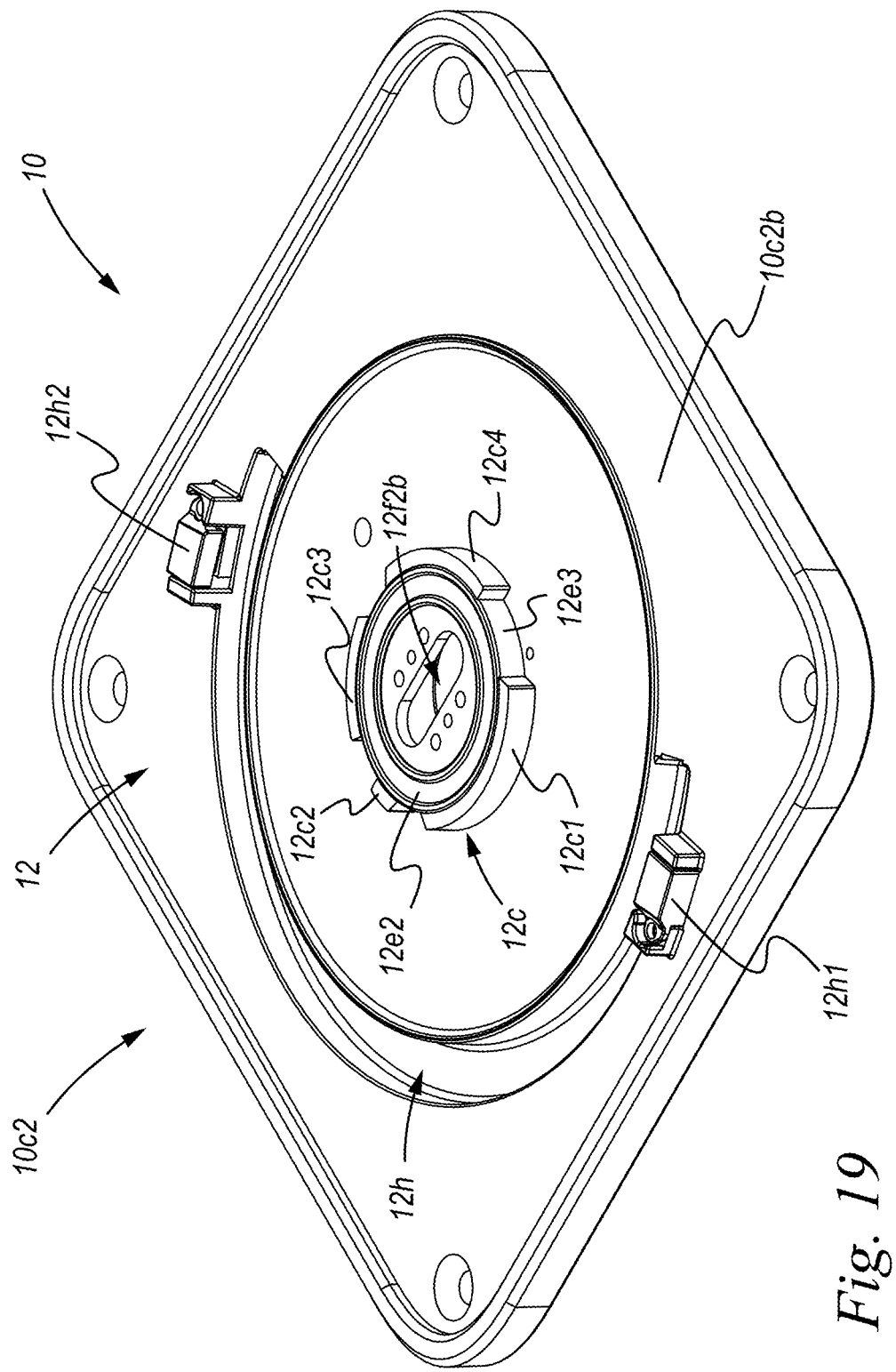
FIG. 19 is top perspective view of lower base assembly portion of FIG. 14 coupled with bearing assembly of FIG. 12 and with coupling member of FIG. 13.

Turning to FIG. 19, a top perspective view is shown of lower assembly 10c2 coupled with both bearing assembly 12e of FIG. 12 and coupling member 12f of FIG. 13, which allows for smooth rotation of elongated stand assembly 10b while maintaining a secure attachment to base assembly 10c. In implementations, bearing assembly 12e seats between coupling member circumferential flange 12f1 of coupling member 12f and lower floor, with inner surface 12f1a of circumferential flange 12f1 contacting mid-ring 12e2 of bearing assembly 12e for axial load distribution. Frictional coupling of outer race 12e3 to retaining tab plurality 12c provides engagement of bearing assembly 12e with lower assembly 10c2 of base assembly 10c. Implementations can include preloaded springs or clamps for adjustment of coupling.

Figure 20:
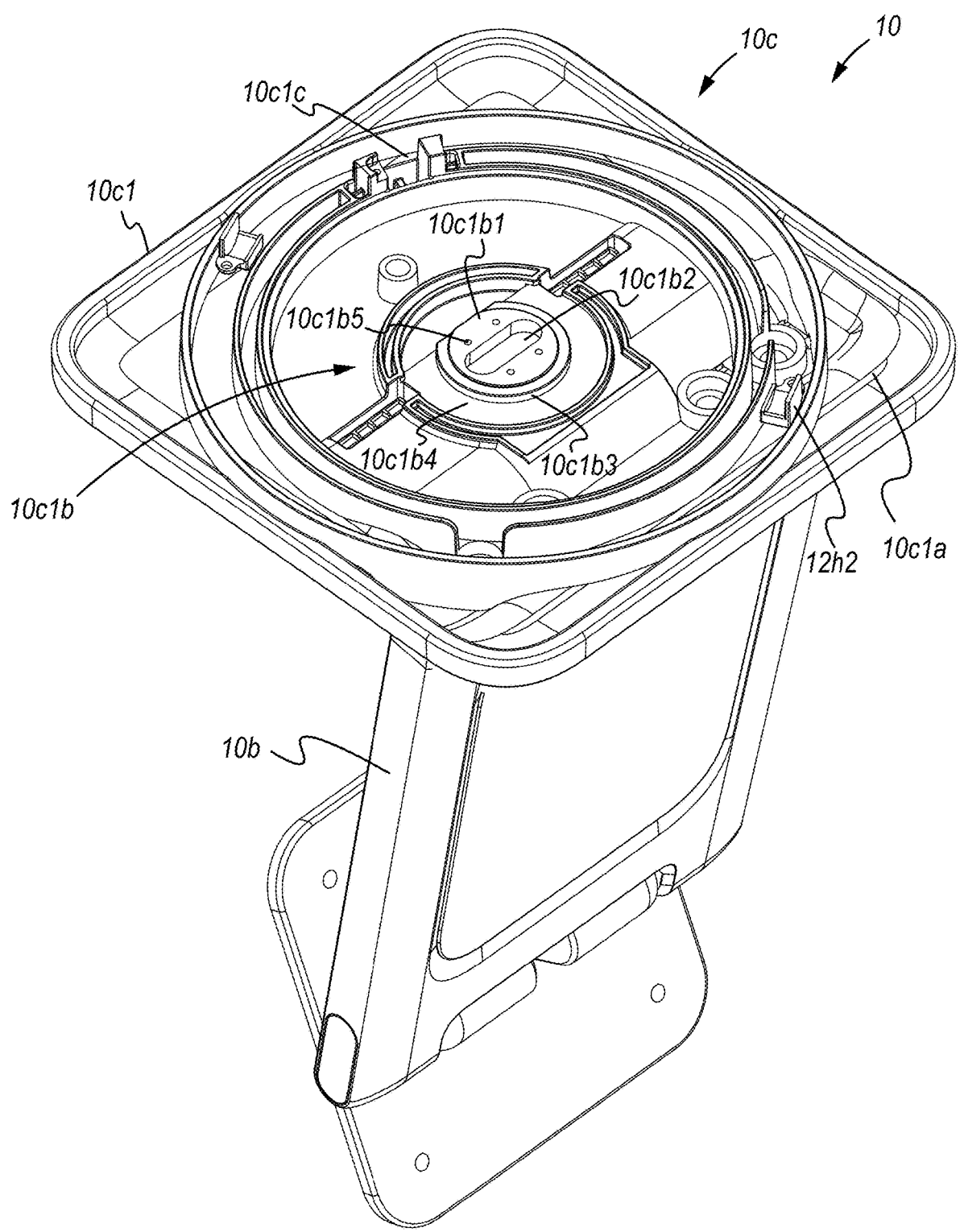
FIG. 20 is a bottom perspective view of a lower portion of device stand system of FIG. 1 including an upper portion of base assembly of FIG. 11 along with two magnets of lower base assembly portion of FIG. 16.

Turning to FIG. 20, a bottom perspective view is provided of a lower portion of device stand system 10 including upper assembly 10c1 of base assembly 10c along with two magnets 12h1 and 12h2 of lower assembly 10c2. In implementations upper assembly 10c1 includes rotational assembly 10c 1b having inner surface 10c1b1, elongated aperture 10c1b2, circumferential wall 10c1b3, internal surface 10c1b4, and apertures 10c1b5. In implementations upper assembly 10c1 includes magnet 10c1c positioned to align with magnets 12h1 and 12h2 for magnetic coupling. In implementations coupling member 12f is fastened to rotational assembly 10c1b via screws mating between apertures 12f2a1-12f2a6 and apertures 10c 1b5 thereby creating a secure rotational drive connection. Implementations included replacement or supplementation of magnetic retention such as with spring plungers or ball detents.

Figure 21:
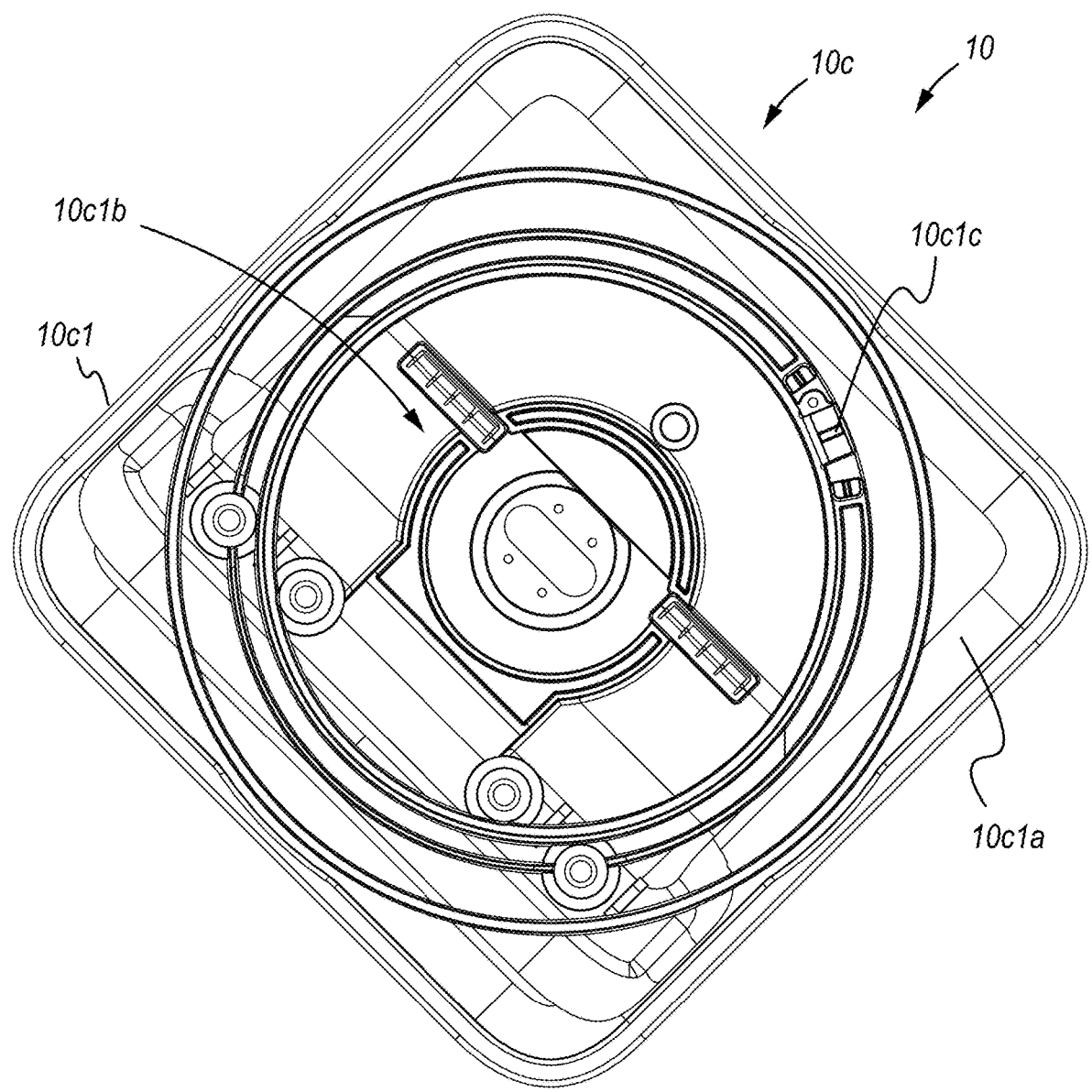
FIG. 21 is a bottom plan view of upper base assembly portion of FIG. 20.

Turning to FIG. 21, a bottom plan view of upper assembly 10c1 is shown, depicting arrangement of rotational assembly 10c1b and its associated structural features. Surfaces of rotational assembly 10c1b interface with coupling member 12f and bearing assembly 12e. In implementations ribs may be added to rotational assembly 10c1b for rigidity. Apertures 10c1b5 of rotational assembly 10c1b are positioned to receive screws passing through apertures 12f2a1-12f2a6 of coupling member 12f for fastening.

Figure 22:
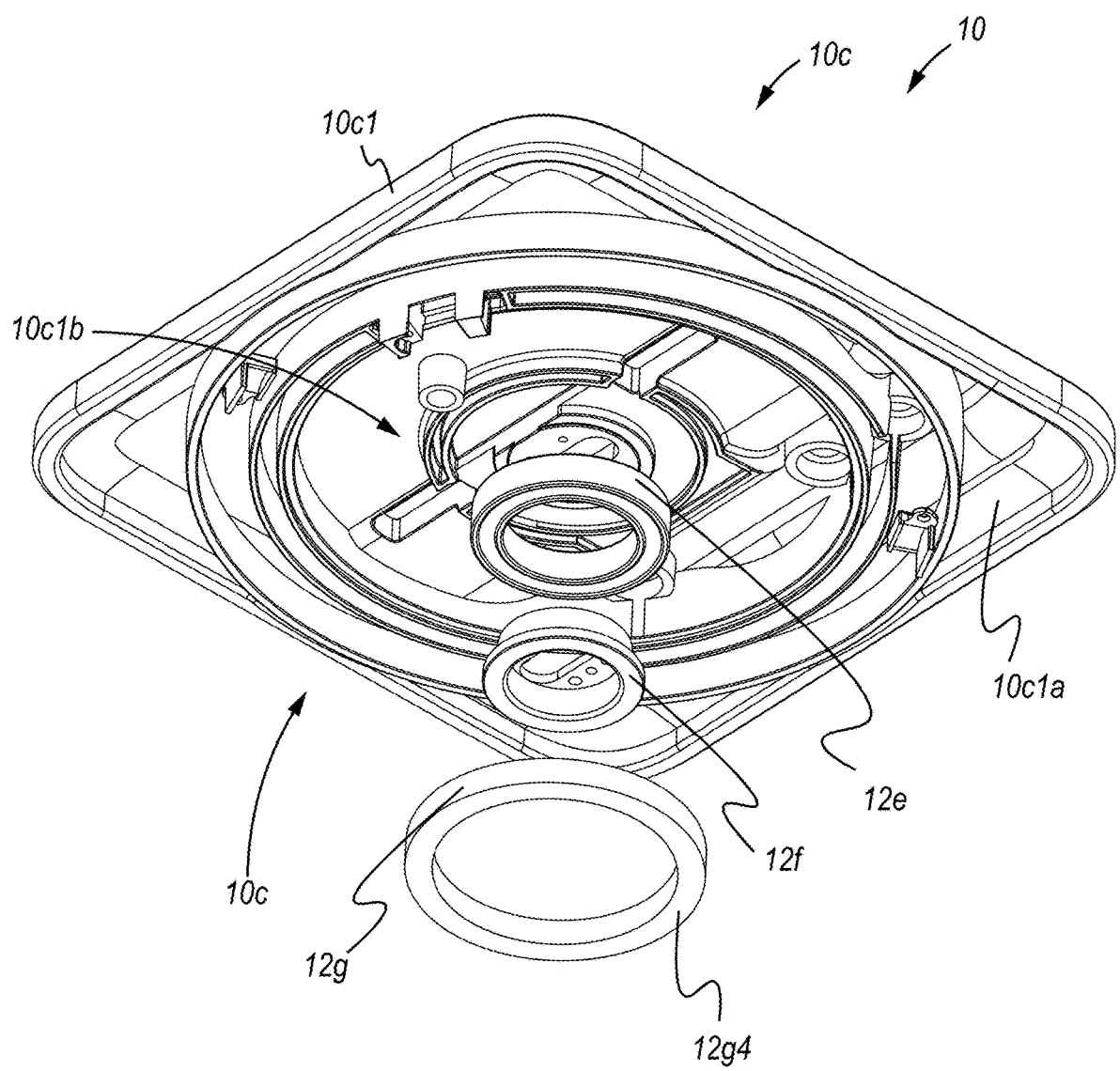
FIG. 22 is an exploded bottom perspective view of upper base assembly portion of FIG. 20 with bearing assembly of FIG. 12, coupling member of FIG. 13 and ring support member of FIG. 14.

Turning to FIG. 22, an exploded bottom perspective view of upper assembly 10c1 with bearing assembly 12e of FIG. 12, coupling member 12f of FIG. 13, and ring support member 12g of FIG. 14 are illustrated. In implementations bottom surface 12g4 of ring support member 12g is positioned to contact inner surface 10c2b of lower assembly 10c2 stabilization with upper assembly 10c1. In implementations frictional coupling between peripheral wall 12f2c of cylindrical portion 12f2 of coupling member 12f and inner race 12e1 of bearing assembly 12e, along with frictional coupling of outer race 12e3 with retaining tab plurality 12c, holds bearing assembly 12e in place. In turn, bearing assembly 12e allows for rotational movement between lower assembly 10c2 and coupling member 12f, which being rigidly coupled to upper assembly 12c1 thereby providing for rotational movement between lower assembly 10c2 and upper assembly 10c1 of base assembly 10c. In implementations modular design allows for replacement of individual components without need of replacement of base assembly 10c in its entirety.

Figure 23:
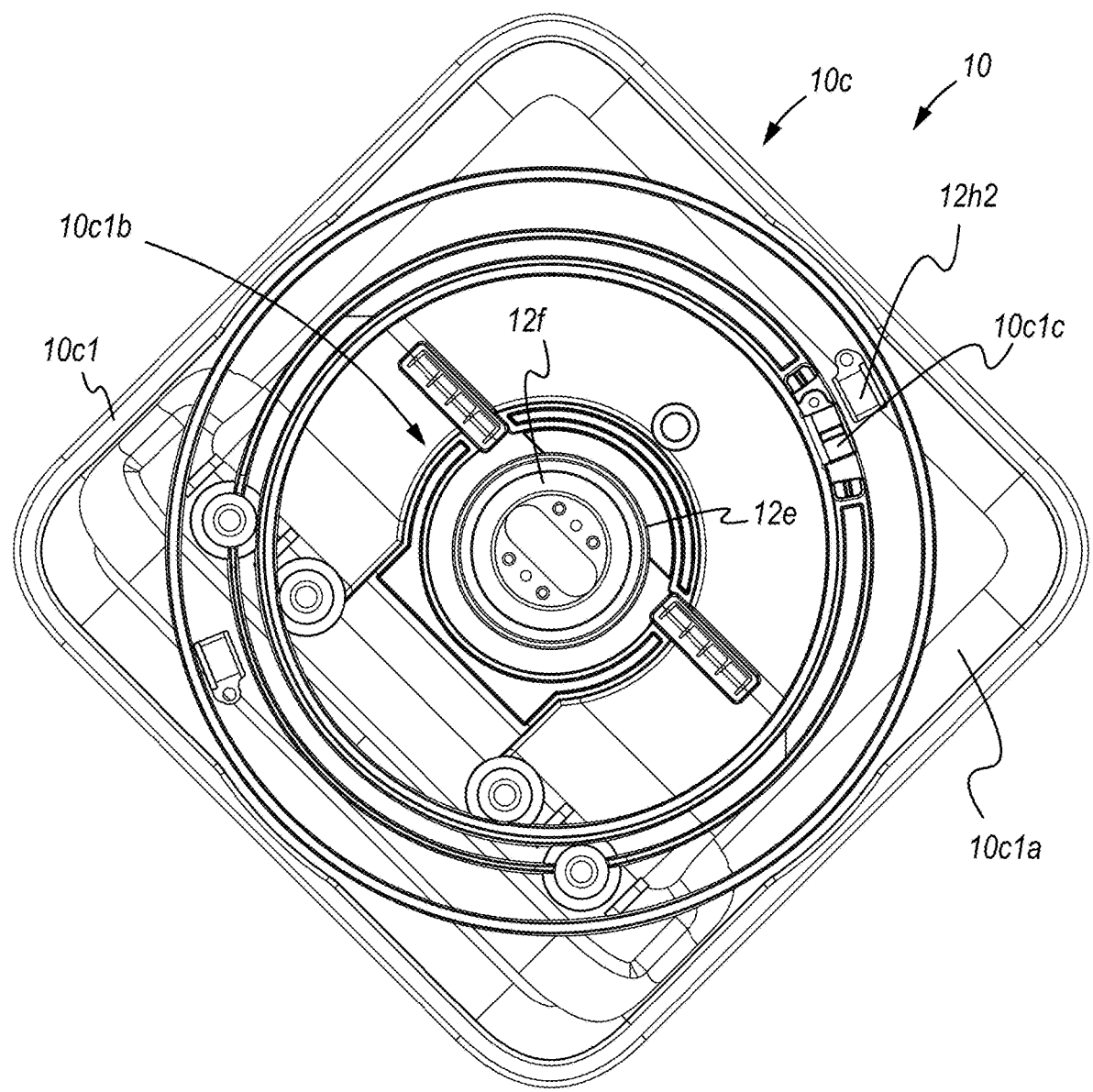
FIG. 23 is a bottom plan view of upper base assembly portion of FIG. 20 coupled with bearing assembly of FIG. 12, coupling member of FIG. 13 and ring support member of FIG. 14 along with two magnets of lower base assembly portion of FIG. 16.

Turning to FIG. 23, depicted therein is a bottom plan view of upper assembly 10c1 coupled with bearing assembly 12e, and coupling member 12f, along with magnets 12h1 and 12h2 of lower assembly 10c2 and magnet 10c1c of upper assembly 10c1 for tactical sensing of rotational position wherein magnet strength and number may be adjusted to tune rotational feel. In implementations coupling member 12f is fastened to upper assembly rotational assembly 10c1b via screws between apertures 12f2a1-12f2a6 and apertures 10c1b5.

Figure 24:
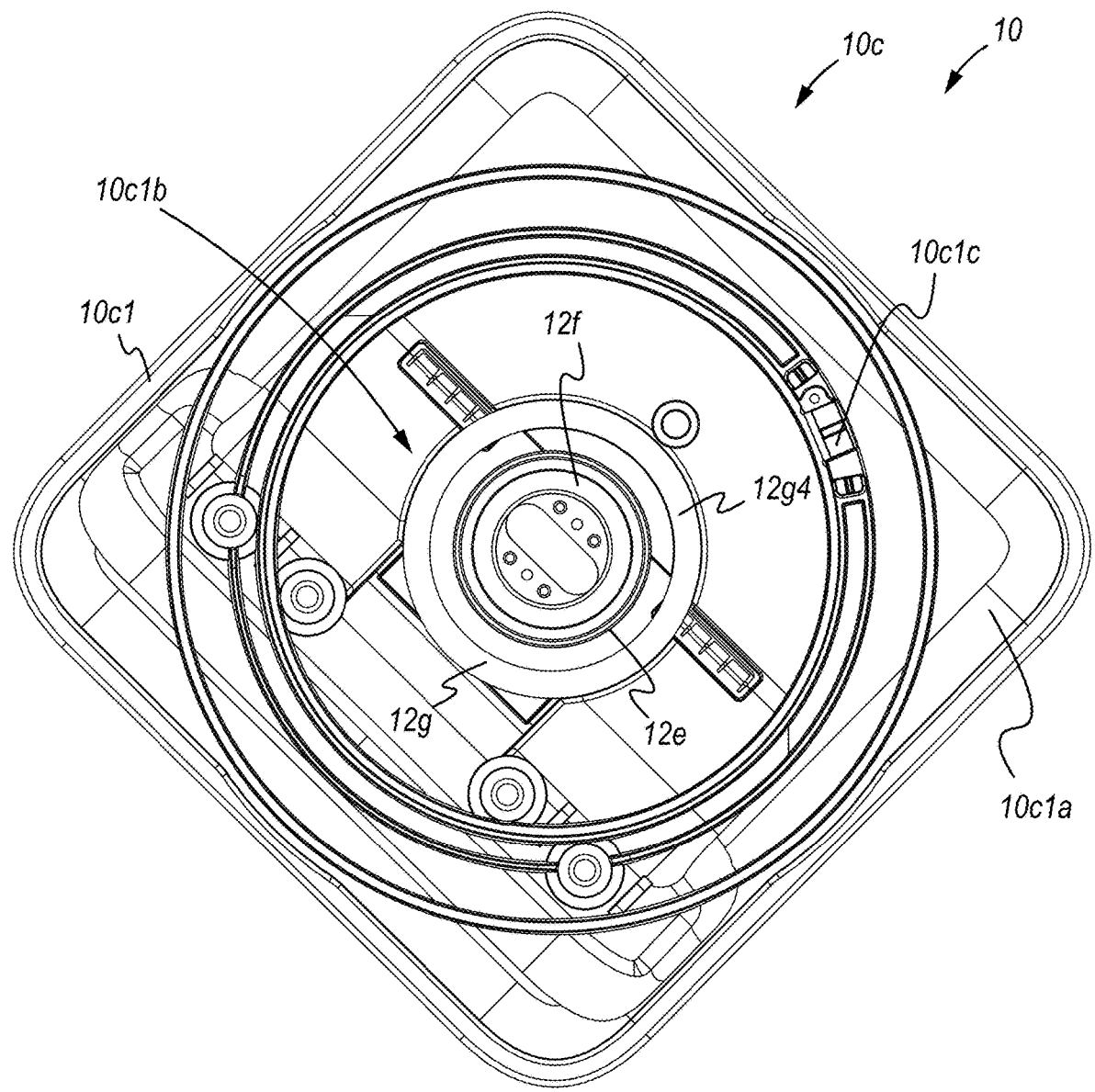
FIG. 24 is a bottom plan view of upper base assembly portion of FIG. 20 coupled with bearing assembly of FIG. 12, coupling member of FIG. 13 and ring support member of FIG. 14.

Turning to FIG. 24, depicted therein is a bottom plan view of upper assembly 10c1 coupled with bearing assembly 12e, coupling member 12f, and ring support member 12g, illustrating mechanical engagement between parts.

Figure 25:
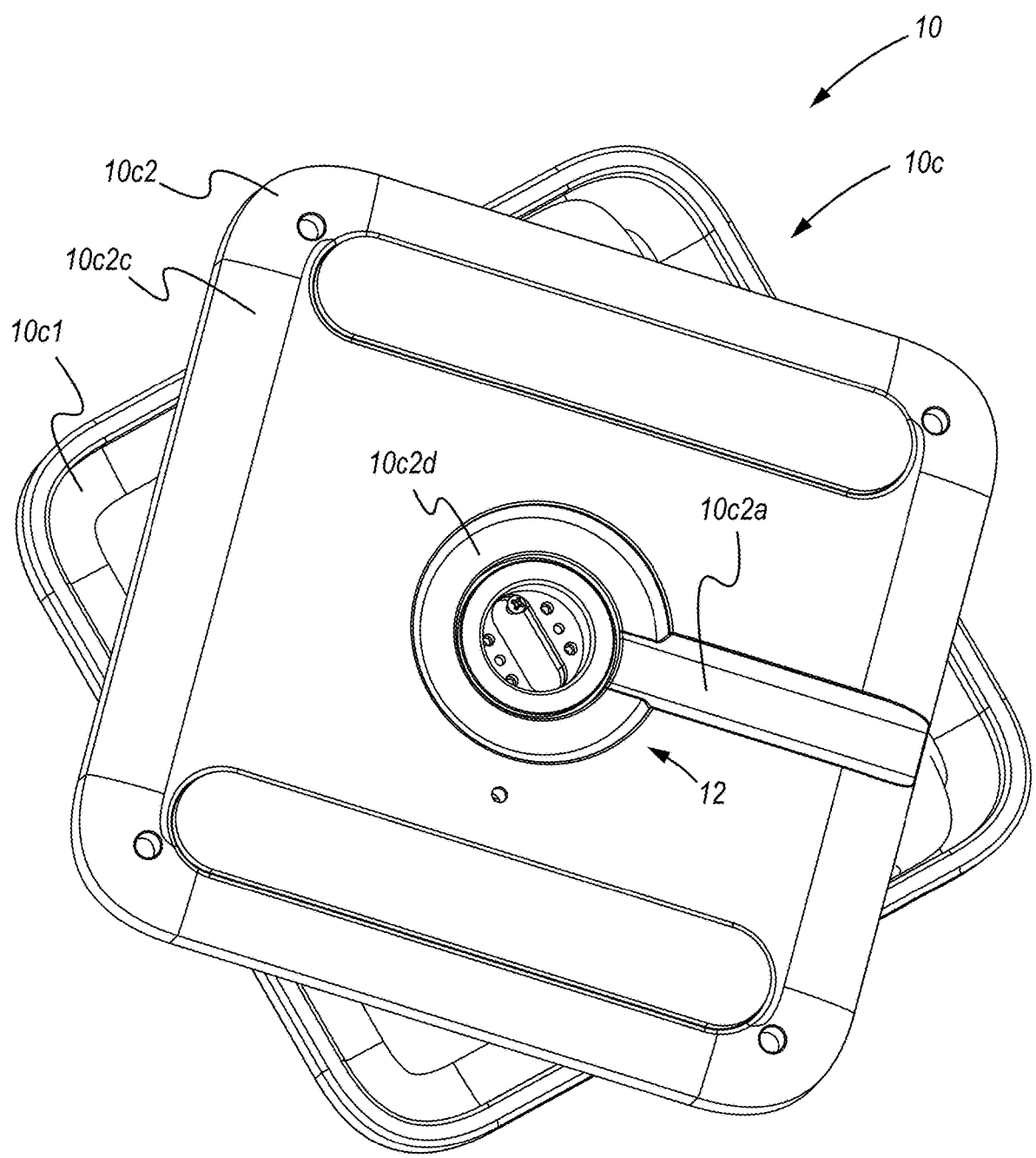
FIG. 25 is a bottom plan view of base assembly of FIG. 11 of device stand system of FIG. 1 in third rotational position.

Turning to FIG. 25, depicted therein is a bottom plan view of base assembly 10c of device stand system 10 in third rotational position, showing relative alignment of rotational assembly components in this orientation.

Figure 26:
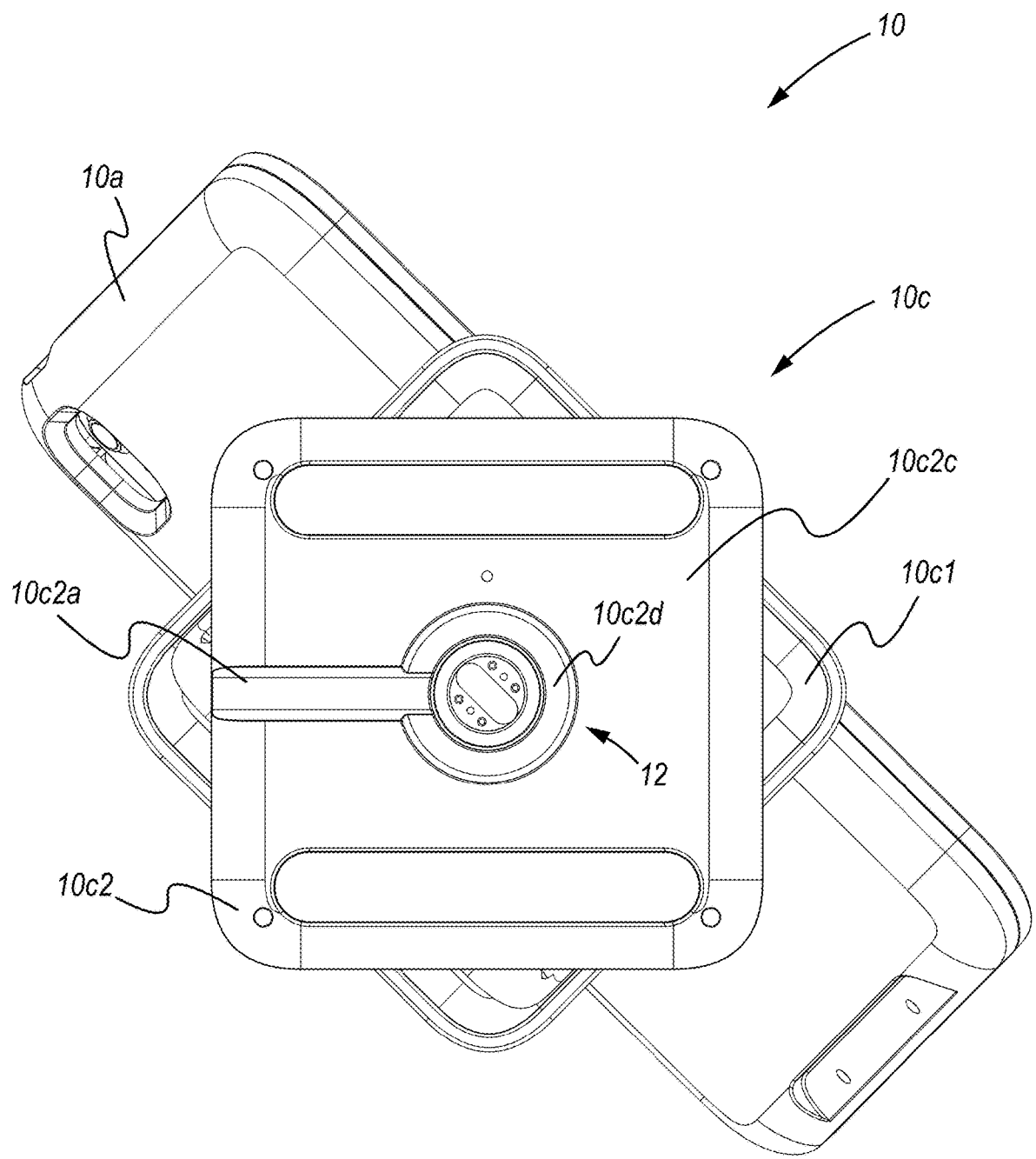
FIG. 26 is a bottom plan view of device stand system of FIG. 1 in third rotational position.

Turning to FIG. 26, depicted therein is a bottom plan view of device stand system 10 in third rotational position, demonstrating relationship between device holder assembly 10a and upper assembly 10c1 of base assembly 10c in rotational respect to lower assembly 12c2 of base assembly 10c.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A device stand system for a portable electronic device, the device stand system comprising:
    (I) a device holder assembly couplable with the portable electronic device;
    (II) an elongated stand assembly including
        (i) at least one interior channel,
        wherein the stand assembly is coupled with the device holder assembly; and
    (III) a base assembly including
        (i) an upper assembly fixedly coupled to the elongated stand assembly, and
        (ii) a lower assembly rotatably coupled to the upper assembly with respect to an axis of rotation,
    wherein the lower assembly includes a plurality of radially oriented retaining tabs,
    wherein the lower assembly of the base assembly includes an aperture,
    wherein the plurality of radially oriented retaining tabs are vertically oriented, disposed in a horizontal plane of the lower assembly of the base assembly, and encircle the aperture of the lower assembly of the base assembly,
    wherein the lower assembly includes a coupling member,
    wherein the coupling member includes
        a circumferential flange defining an inner surface,
        a cylindrical portion extending from the circumferential flange,
        an end face portion disposed at a distal end of the cylindrical portion,
        a plurality of apertures formed through the end face portion, and
        an elongated aperture formed through the end face portion,
    wherein the cylindrical portion includes a circumferentially extending peripheral wall,
    wherein the bearing assembly includes an inner race frictionally coupled at least partially to the circumferentially extending peripheral wall of the cylindrical portion of the coupling member,
    wherein the upper assembly includes a rotational assembly,
    wherein the rotational assembly includes:
        an inner surface,
        an internal surface,
        an elongated aperture formed through the inner surface,
        a circumferential wall extending from the inner surface to the internal surface,
        the internal surface disposed around the circumferential wall, and
        a plurality of apertures formed through the inner surface, and
    wherein the lower assembly of the base assembly includes an outer surface and a grooved channel positioned relative to the outer surface.

2. The device stand system of claim 1,
    wherein the elongated aperture of the rotational assembly of the upper assembly, the elongated aperture of the coupling member, and the grooved channel of the lower assembly are aligned to define a common passageway.

3. The device stand system of claim 1,
    wherein the lower assembly includes a bearing assembly with an outer race frictionally coupled with the plurality of radially oriented retaining tabs.

4. The device stand system of claim 1,
    wherein the inner surface of the circumferential flange contacts one or more portions of the bearing assembly.

5. The device stand system of claim 1,
    wherein the end face portion of the cylindrical portion of the coupling member is fixedly coupled to the upper assembly of the base assembly.

6. The device stand system of claim 5,
    wherein the end face portion includes fastener receiving apertures to receive fasteners to fixedly couple with the upper assembly of the base assembly.

7. The device stand system of claim 1,
further including a ring support member,
wherein the ring support member is positioned to seat against the upper assembly of the base assembly and encircle the internal surface.

8. The device stand system of claim 1,
wherein the circumferential wall of the rotational assembly is sized to contact a portion of the inner race of the bearing assembly when the coupling member is coupled with the upper assembly and the inner race is frictionally coupled with the coupling member.

9. A device stand system for a portable electronic device, the device stand system comprising:
(I) a device holder assembly couplable with the portable electronic device; and
(II) a base assembly including
 (i) an upper assembly fixedly coupled to the device holder assembly, and
 (ii) a lower assembly rotatably coupled to the device holder assembly with respect to an axis of rotation,
wherein the lower assembly includes a plurality of radially oriented retaining tabs,
wherein the lower assembly of the base assembly includes an aperture,
wherein the plurality of radially oriented retaining tabs are vertically oriented, disposed in a horizontal plane of the lower assembly of the base assembly, and encircle the aperture of the lower assembly of the base assembly,
wherein the coupling member includes
 a circumferential flange defining an inner surface,
 a cylindrical portion extending from the circumferential flange,
 an end face portion disposed at a distal end of the cylindrical portion,
 a plurality of apertures formed through the end face portion,
 an elongated aperture formed through the end face portion, and
wherein the cylindrical portion includes a circumferentially extending peripheral wall; and
wherein the bearing assembly includes an inner race frictionally coupled at least partially to the circumferentially extending peripheral wall of the cylindrical portion of the coupling member,
wherein the upper assembly includes a rotational assembly;
wherein the rotational assembly includes:
 an inner surface,
 an internal surface,
 an elongated aperture formed through the inner surface,
 a circumferential wall extending from the inner surface to the internal surface,
 the internal surface disposed around the circumferential wall, and
 a plurality of apertures formed through the inner surface;
wherein the lower assembly of the base assembly includes an outer surface and a grooved channel positioned relative to the outer surface; and
wherein the elongated aperture of the rotational assembly of the upper assembly, the elongated aperture of the coupling member, and the grooved channel of the lower assembly are aligned to define a common passageway.

\* \* \* \* \*